(12) United States Patent
Daimatsu et al.

(10) Patent No.: US 11,550,179 B2
(45) Date of Patent: Jan. 10, 2023

(54) OPTICAL FILM

(71) Applicant: SUMITOMO CHEMICAL COMPANY, LIMITED, Tokyo (JP)

(72) Inventors: Kazuki Daimatsu, Osaka (JP); Hitoshi Fukui, Osaka (JP); Masayoshi Karasawa, Osaka (JP)

(73) Assignee: SUMITOMO CHEMICAL COMPANY, LIMITED, Tokyo (JP)

(*) Notice: Subject to any disclaimer, the term of this patent is extended or adjusted under 35 U.S.C. 154(b) by 570 days.

(21) Appl. No.: 16/573,260

(22) Filed: Sep. 17, 2019

(65) Prior Publication Data

US 2020/0103694 A1 Apr. 2, 2020

(30) Foreign Application Priority Data

Sep. 28, 2018 (JP) .............................. JP2018-184777
May 16, 2019 (JP) .............................. JP2019-093099

(51) Int. Cl.
| | | |
|---|---|---|
| G02F 1/1333 | (2006.01) | |
| C08L 79/08 | (2006.01) | |
| G02F 1/1335 | (2006.01) | |
| G02B 1/10 | (2015.01) | |
| G02B 5/30 | (2006.01) | |

(52) U.S. Cl.
CPC ........ G02F 1/133305 (2013.01); C08L 79/08 (2013.01); G02B 1/10 (2013.01); G02F 1/133331 (2021.01); G02F 1/133528 (2013.01); C08L 2201/10 (2013.01); C09K 2323/03 (2020.08); G02B 5/30 (2013.01)

(58) Field of Classification Search
CPC ......... G02F 1/133305; G02F 1/133331; G02F 1/133528; G02F 1/133504; G02F 1/133502; G02B 1/10; G02B 5/30; G02B 5/3016; C08L 79/08; C08L 2201/10; C08L 2203/16; C08L 2205/025; C09K 2323/03; C08G 73/1039; C08G 73/1067; C08G 73/14

See application file for complete search history.

(56) References Cited

U.S. PATENT DOCUMENTS

| | | | | |
|---|---|---|---|---|
| 2012/0229423 | A1* | 9/2012 | Takamiya | G02B 5/0221 178/18.09 |
| 2014/0155526 | A1 | 6/2014 | Fujibayashi | |
| 2016/0215132 | A1 | 7/2016 | Zheng et al. | |
| 2017/0101509 | A1* | 4/2017 | Jee | C08G 73/14 |
| 2017/0152358 | A1 | 6/2017 | Koh et al. | |
| 2017/0276840 | A1* | 9/2017 | Horio | B32B 27/30 |
| 2017/0309867 | A1 | 10/2017 | Mun et al. | |
| 2017/0329062 | A1 | 11/2017 | Nakajima et al. | |
| 2018/0251398 | A1* | 9/2018 | Ikegami | G02F 1/1333 |
| 2018/0257335 | A1 | 9/2018 | Matsuo et al. | |
| 2018/0348411 | A1 | 12/2018 | Yamaki et al. | |
| 2018/0370207 | A1* | 12/2018 | Nodono | C08J 7/0427 |
| 2019/0009505 | A1* | 1/2019 | Song | B32B 15/08 |
| 2019/0010291 | A1* | 1/2019 | Choi | C08G 73/1039 |
| 2019/0224942 | A1 | 7/2019 | Matsuo et al. | |
| 2019/0358865 | A1 | 11/2019 | Lee et al. | |
| 2019/0390057 | A1 | 12/2019 | Miyamoto et al. | |
| 2020/0064540 | A1 | 2/2020 | Nichol et al. | |

FOREIGN PATENT DOCUMENTS

| | | | | |
|---|---|---|---|---|
| JP | H09-48866 | A | 2/1997 | |
| JP | 2009-215412 | A | 9/2009 | |
| JP | 2010-139379 | A | 6/2010 | |
| JP | 2014-108994 | A | 6/2014 | |
| JP | 2016-23232 | A | 2/2016 | |
| JP | 2017-25204 | A | 2/2017 | |
| JP | 2017-203984 | A | 11/2017 | |
| JP | 2018-65993 | A | 4/2018 | |
| JP | 2018-119132 | A | 8/2018 | |
| JP | 2018-119144 | A | 8/2018 | |
| JP | 2018-203986 | A | 12/2018 | |
| JP | 6670967 | B1 * | 3/2020 | B32B 27/08 |
| KR | 10-2017-0108993 | A | 9/2017 | |
| KR | 10-2017-0126798 | A | 11/2017 | |
| KR | 102108371 | B1 * | 5/2020 | B32B 27/08 |
| WO | WO 2017/014287 | A1 | 1/2017 | |
| WO | WO 2018/147618 | A1 | 8/2018 | |

OTHER PUBLICATIONS

"CIE standard colorimetric observers," JIS, 1999, pp. 235-242, Z8781.
"CIE standard colorimetric observers," JIS, 1999, pp. 243-266, Z8782.
"Colorimetry—Part 2: CIE standard colorimetric illuminants," JIS, 2012, pp. 401-412, Z8781-2.
"Haze Meter New Model NDH 5000W," Nippon Denshoku Industries Co., LTD, prior to Dec. 2006, 2 pages total.
"Introduction to color engineering," Morikita Publishing Co., Ltd., May 1, 2007, pp. 154-155 (3 pages total).
"JIS Handbook," JIS General Inventory, Jan. 23, 2013, pp. 634-635.
"Plastics—How to find haze of transparent material," JIS, 2000, JIS K 7136, pp. 1-8 (12 pages total).
"Optical test method for plastics," JIS, JIS K 7105, 1981, 36 pages total.
Japanese Office Action for Japanese Application No. 2020-700723, dated Jul. 1, 2021, with English translation.
Japanese Office Action for Japanese Application No. 2019-093099, dated Oct. 15, 2019, with English translation.

(Continued)

*Primary Examiner* — Sophie Hon
(74) *Attorney, Agent, or Firm* — Birch, Stewart, Kolasch & Birch, LLP

(57) ABSTRACT

To provide an optical film having excellent visibility in the wide angle direction. An optical film including at least one resin selected from the group consisting of a polyimide-based resin and a polyamide-based resin, wherein the optical film satisfies Formula (1):

$$0 \leq Ts \leq 0.35 \quad (1)$$

wherein Ts represents a scattered light ratio (%) and is defined as Ts=Td/Tt×100, Td and Tt represent a diffuse light transmittance (%) and a total light transmittance (%), measured in accordance with JIS K-7136, respectively.

9 Claims, No Drawings

(56) References Cited

OTHER PUBLICATIONS

Japanese Office Action for Japanese Application No. 2020-700723, dated Dec. 9, 2020, with English translation.
Japanese Office Action for Japanese Application No. 2020-700723, dated Jan. 7, 2022, with English translation.
Korean Office Action for Korean Application No. 10-2019-0078152, dated Dec. 3, 2019, with English translation.
Korean Office Action for Korean Application No. 10-2019-0078152, dated Sep. 17, 2019, with English translation.
Lee et al., "Preparation and Characterizations of Polymethylmethacrylate (PMMA)/Acrlate Rubber {ACM} Blend for Light Diffuser Applications," Elastomers and Composites, vol. 50, No. 1, Mar. 2015, pp. 49-54.

* cited by examiner

OPTICAL FILM

BACKGROUND OF THE INVENTION

Field of the Invention

The present invention relates to an optical film used as a front plate of a flexible display and the like and a flexible display device including the optical film.

Description of the Related Art

Conventionally, glass has been used as a material of display members such as a solar cell or an image display device. However, the glass was not sufficient to meet the recent demands for miniaturization, thinness, weight reduction, and flexibility of the display members. Therefore, as an alternative material of glass, various films are being considered. Examples of such a film include an optical film including a polyimide-based resin (for example, JP-A-2009-215412).

SUMMARY OF THE INVENTION

When an optical film is applied to a transparent member such as a front plate of a flexible display device, an image may be displayed with an image display surface being bent, and thus, excellent visibility in the wide angle direction is required as compared with a non-flexible image display surface. However, according to the present inventor's study, it has been found that a conventional optical film including a polyimide-based resin may not sufficiently satisfy the visibility in the wide angle direction.

Therefore, an object of the present invention is to provide an optical film having excellent visibility in the wide angle direction and a flexible display device including the optical film.

As a result of intensive study for solving the above problems, the present inventor found that in an optical film including at least one selected from the group consisting of a polyimide-based resin and a polyamide-based resin, when the scattered light ratio is in a predetermined range, the above problems can be solved, and completed the present invention. That is, the present invention includes the following embodiments:

[1] An optical film including at least one resin selected from the group consisting of a polyimide-based resin and a polyamide-based resin, wherein the optical film satisfies Formula (1):

$$0 \leq Ts \leq 0.35 \quad (1)$$

wherein Ts represents a scattered light ratio (%) and is defined as Ts=Td/Tt×100, Td and Tt represent a diffuse light transmittance (%) and a total light transmittance (%), measured in accordance with JIS K 7136, respectively.
[2] The optical film according to [1], wherein a tensile modulus at 80° C. is 4,000 to 9,000 MPa.
[3] The optical film according to [1] or [2], wherein a ΔTs of an absolute value of a difference in the scattered light ratios before and after a bending test in accordance with JIS K 5600-5-1 is 0.15% or less.
[4] The optical film according to any one of [1] to [3], wherein the optical film has a thickness of 10 to 150 μm.
[5] The optical film according to any one of [1] to [4], wherein a content of a filler relative to a mass of the optical film is 5% by mass or less.
[6] The optical film according to any one of [1] to [5], wherein the optical film has a hard coat layer on at least one surface thereof.
[7] The optical film according to [6], wherein the hard coat layer has a thickness of 3 to 30 μm.
[8] A flexible display device comprising the optical film according to any one of [1] to [7].
[9] The flexible display device according to [8], further comprising a touch sensor.
[10] The flexible display device according to [8] or [9], further comprising a polarizing plate.

The optical film of the present invention has excellent visibility in the wide angle direction.

DETAILED DESCRIPTION OF THE PREFERRED EMBODIMENTS

[Optical Film]

The optical film of the present invention includes at least one resin selected from the group consisting of a polyimide-based resin and a polyamide-based resin, and satisfies Formula (1):

$$0 \leq Ts \leq 0.35 \quad (1)$$

wherein Ts represents a scattered light ratio (%) and is defined as Ts=Td/Tt×100, Td and Tt represent a diffuse light transmittance (%) and a total light transmittance (%), measured in accordance with JIS K 7136, respectively. In addition, the scattered light ratio may be a scattered light ratio in the range of the thickness of the optical film described later.

As shown in Formula (1), the scattered light ratio (Ts) represents a ratio of the diffuse light transmittance (Td) relative to the total light transmittance (Tt), and as Ts is smaller, the scattered light ratio is smaller, and light is less likely to be scattered on the surface and the inside of the optical film.

The optical film of the present invention has a small scattered light ratio of 0 to 0.35%, and thus, has excellent visibility in the wide angle direction. Therefore, when the optical film of the present invention is applied to an image display device, a phenomenon that a distortion occurs in the image projected on a display unit or the image is blurred can be effectively suppressed even in the case of viewing the optical film from an oblique direction. Since the optical film of the present invention has such characteristics, for example, even when an image is displayed in a state in which the image display surface is bent in the case of being applied to a flexible display, the image can be visually recognized with high sharpness. In the present invention, visibility means ease of view when visually viewing a display unit of an image display device to which the optical film is applied, and for example, represents characteristics of suppressing the phenomenon that a distortion occurs on an image projected on the display unit or the image is blurred. Further, in the present invention, a wide angle direction refers to any angular direction relative to a plane of the optical film, and in particular, refers to an oblique direction relative to the plane of the optical film.

In Formula (1), the diffuse light transmittance (Td) can be measured using a spectrophotometer in accordance with JIS K 7136, for example, by a method described in the Example. Further, the total light transmittance (Tt) can be measured using a haze meter in accordance with JIS K 7136, for example, by the method described in the Example.

In the optical film of the present invention, the scattered light ratio is preferably 0.30% or less, more preferably 0.25% or less, still more preferably 0.20% or less, particularly preferably 0.15% or less, and most preferably 0.10% or less. When the scattered light ratio is the above upper limit or lower, it is easy to improve the visibility in the wide angle direction. The lower limit of the scattered light ratio is 0 or more. In addition, a composition of the optical film, for example, the type and the composition ratio of a repeating structure constituting a resin included in the optical film, and the type and the content of an additive such as a ultraviolet absorbent included in the optical film; the thickness of the optical film; or production conditions of the optical film, for example, the type of a varnish solvent, a drying temperature, a drying time, and the like are appropriately adjusted, such that the optical film can be adjusted to satisfy Formula (1). In particular, when an optical film forming step is performed under conditions described later are performed, it is easy to perform adjustment so as to satisfy Formula (1).

In the optical film of the present invention, the total light transmittance (Tt) is preferably 80% or more, more preferably 85% or more, still more preferably 88% or more, and particularly preferably 90% or more. When the total light transmittance is the above lower limit or higher, the transparency of the optical film becomes good and when the optical film is applied to an image display device, it is easy to express excellent visibility. Further, the upper limit of the total light transmittance is usually 100% or less. In addition, the total light transmittance may be a total light transmittance (Tt) in a range of the thickness of the optical film described later. When the total light transmittance is in the above range, for example, at the time of incorporating the optical film into a display device, there is a tendency that a bright display can be obtained even in the case of reducing the light intensity of a backlight, and energy saving is resulted therefrom.

In the optical film of the present invention, the diffuse light transmittance (Td) is preferably 0.35 or less, more preferably 0.30 or less, still more preferably 0.25 or less, and particularly preferably 0.20 or less. When the diffuse light transmittance (Td) is the above upper limit or lower, the scattered light ratio is small and it is easy to improve the visibility in the wide angle direction. Further, the lower limit of the diffuse light transmittance (Td) is usually 0.01 or more. In addition, the diffuse light transmittance may be a diffuse light transmittance (Td) in a range of the thickness of the optical film described later.

In a preferred embodiment of the present invention, the optical film of the present invention can also have an excellent tensile modulus, in addition to the excellent visibility in the wide angle direction. The tensile modulus at 80° C. of the optical film is preferably 4,000 MPa or more, more preferably 4,500 MPa or more, and particularly preferably 5,000 MPa or more and preferably 9,000 MPa or less and more preferably 8,500 MPa or less. Within the range of the tensile modulus, there is a tendency that it becomes difficult to produce dent defects on the optical film, and also it becomes easy to express bending resistance. In addition, the tensile modulus of the optical film can be measured using a tensile tester in accordance with JIS K 7127, for example, by the method described in the Example.

In a preferred embodiment of the present invention, the optical film of the present invention has excellent folding endurance. In the optical film of the present invention, the number of times of folding endurance in an MIT folding endurance fatigue test in accordance with ASTM standard D2176-16 is preferably 200,000 or more, more preferably 300,000 or more, still more preferably 500,000 or more, and particularly preferably 700,000 or more. When the number of times of folding endurance is the above lower limit or higher, it is difficult for cracks, breakages, and the like to occur even in the case in which the optical film is bent. In addition, an MIT folding endurance fatigue test can be measured, for example, by a method described in the Example.

In a preferred embodiment of the present invention, the optical film of the present invention has excellent bending resistance. Therefore, even in the case in which the optical film is repeatedly bent, optical characteristics can be maintained. In the optical film of the present invention, the absolute value $\Delta Ts$ (%) of a difference in scattered light ratios before and after a bending test in accordance with JIS K 5600-5-1 is preferably 1.4% or less, more preferably 1.2% or less, still more preferably 1.0% or less, still further preferably 0.5% or less, particularly preferably 0.1% or less, more particularly preferably 0.05% or less, and most preferably 0.02% or less. Within the above range of $\Delta Ts$, when the optical film is applied to an image display device such as a flexible display, it is easy to maintain excellent visibility in the wide angle direction even in the case of being repeatedly bent. In addition, the bending test can be measured by a bending tester in accordance with JIS K 5600-5-1, for example, by a method described in the Example. In the present specification, the optical characteristics represent characteristics which can be optically evaluated, including, for example, the scattered light ratio, the diffuse light transmittance, the total light transmittance, a yellow index (YI), and haze, and "optical characteristics being improved" means that, for example, the scattered light ratio is lowered, the diffuse light transmittance is lowered, the total light transmittance is raised, the yellow index is lowered, the haze is lowered, or the like.

In an embodiment of the present invention, the haze of the optical film of the present invention is preferably 1.0% or less, more preferably 0.5% or less, still more preferably 0.4% or less, particularly preferably 0.3% or less, and most preferably 0.2% or less. When the haze of the optical film is the above upper limit or lower, transparency becomes good, and when the optical film is applied to an image display device, it is easy to express excellent visibility. Further, the lower limit of the haze is usually 0.01% or more. In addition, the haze can be measured using a haze computer in accordance with JIS K 7136:2000.

The yellow index (YI) of the optical film of the present invention is preferably 4.0 or less, more preferably 3.0 or less, still more preferably 2.5 or less, and particularly preferably 2.0 or less. When the yellow index of the optical film is the above upper limit or lower, transparency becomes good, and for example, when the optical film is applied to an image display device, it is easy to express excellent visibility. Further, the yellow index is usually −5 or more, and more preferably −2 or more. In addition, the yellow index (YI) can be calculated based on the Formula of YI=100×(1.2769X−1.0592Z)/Y, after measuring the transmittance for light of 300 to 800 nm using an ultraviolet-visible near infrared spectrophotometer in accordance with JIS K 7373:2006 to determine tristimulus values (X, Y, Z).

The thickness of the optical film of the present invention is appropriately adjusted depending on the use, but preferably 10 μm or more, more preferably 20 μm or more, still more preferably 25 μm or more, and particularly preferably 30 μm or more, and preferably 150 μm or less, more preferably 100 μm or less, and still more preferably 85 μm or less. It is advantageous that the range of the thickness of the optical film is in the above range, from the viewpoint of bending resistance and visibility. The thickness of the optical film can be measured by a film thickness meter, or the like, for example, by a method described in the Example.

<Resin>

The optical film of the present invention contains at least one resin selected from the group consisting of a polyimide-based resin and a polyamide-based resin. The polyimide-based resin represents at least one resin selected from the group consisting of a resin containing a repeating structural unit containing an imide group (hereinafter, referred to as a polyimide resin) and a resin containing a repeating structural unit containing both an imide group and an amide group (hereinafter, referred to as a polyamideimide resin). Further, the polyamide-based resin represents a resin containing a repeating structural unit containing an amide group.

The polyimide-based resin preferably has a repeating structural unit represented by Formula (10). Here, G is a tetravalent organic group, and A is a divalent organic group. The polyimide-based resin may contain two or more types of repeating structural units represented by Formula (10) in which G and/or A is different.

[Chem. 1]

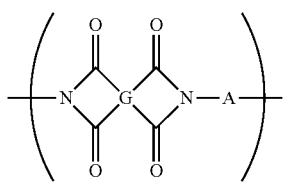
(10)

The polyimide-based resin includes at least one repeating structural unit selected from the group consisting of repeating structural units represented by Formula (11), Formula (12), and Formula (13), in a range in which various physical properties of the optical film are not impaired.

[Chem. 2]

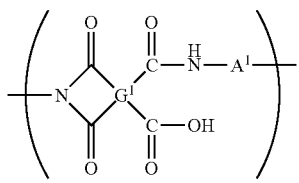
(11)

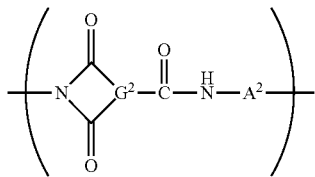
(12)

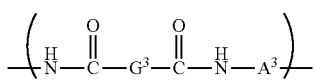
(13)

In Formulas (10) and (11), G and $G^1$ each independently represent a tetravalent organic group and preferably an organic group which may be substituted into a hydrocarbon group or a fluorine-substituted hydrocarbon group. As G and $G^1$, groups represented by Formula (20), Formula (21), Formula (22), Formula (23), Formula (24), Formula (25), Formula (26), Formula (27), Formula (28), or Formula (29) and a tetravalent chain hydrocarbon group having 6 or less carbon atoms are exemplified. Among them, since the yellow index (YI value) of the optical film tends to be suppressed, among them, the groups represented by Formula (20), Formula (21), Formula (22), Formula (23), Formula (24), Formula (25), Formula (26), or Formula (27) are preferable.

[Chem. 3]

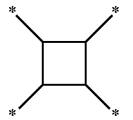
(20)

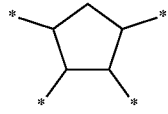
(21)

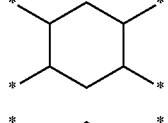
(22)

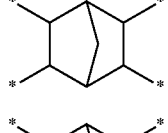
(23)

(24)

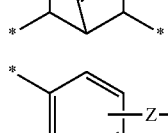
(25)

(26)

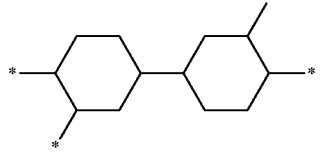
(27)

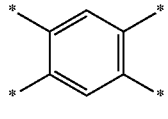
(28)

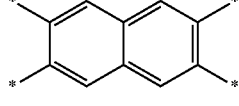
(29)

In formulas (20) to (29),

* represents a bond,

Z represents a single bond, —O—, —CH$_2$—, —CH$_2$—CH$_2$—, —CH(CH$_3$)—, —C(CH$_3$)$_2$—, —C(CF$_3$)$_2$—, —Ar—, —SO$_2$—, —CO—, —O—Ar—O—, —Ar—O—

Ar—, —Ar—CH$_2$—Ar—, —Ar—C(CH$_3$)$_2$—Ar— or —Ar—SO$_2$—Ar—. Ar represents an arylene group which may be substituted into a fluorine atom and has 6 to 20 carbon atoms, and a specific example thereof includes a phenylene group.

In Formula (12), G$^2$ is a trivalent organic group, preferably an organic group which may be substituted into a hydrocarbon group or a fluorine-substituted hydrocarbon group. As G$^2$, a group in which any one of bonds of groups represented by Formula (20), Formula (21), Formula (22), Formula (23), Formula (24), Formula (25), Formula (26), Formula (27), Formula (28), or Formula (29) is substituted into a hydrogen atom and a trivalent chain hydrocarbon group having 6 or less carbon atoms are exemplified.

In Formula (13), G$^3$ is a divalent organic group, and preferably an organic group which may be substituted into a hydrocarbon group or a fluorine-substituted hydrocarbon group. As G$^3$, a group in which, of bonds of groups represented by Formula (20), Formula (21), Formula (22), Formula (23), Formula (24), Formula (25), Formula (26), Formula (27), Formula (28), or Formula (29), two bonds which are not adjacent to each other are substituted into a hydrogen atom and a chain hydrocarbon group having 6 or less carbon atoms are exemplified.

In Formulas (10) to (13), A, A$^1$, A$^2$, and A$^3$ each independently represent a divalent organic group and preferably an organic group which may be substituted into a hydrocarbon group or a fluorine-substituted hydrocarbon group. As A, A$^1$, A$^2$, and A$^3$, a group represented by Formula (30), Formula (31), Formula (32), Formula (33), Formula (34), Formula (35), Formula (36), Formula (37), or Formula (38); a group substituted into a methyl group, a fluoro group, a chloro group, or a trifluoromethyl group; and a chain hydrocarbon group having 6 or less carbon atoms are exemplified.

[Chem. 4]

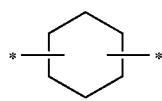
(30)

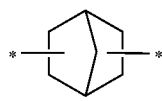
(31)

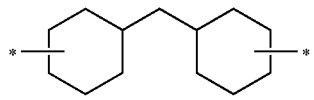
(32)

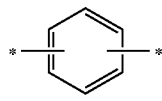
(33)

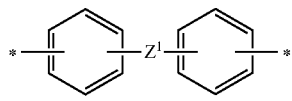
(34)

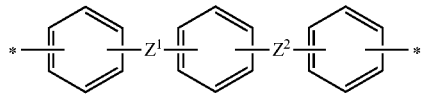
(35)

-continued

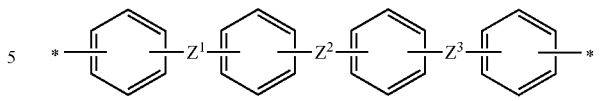
(36)

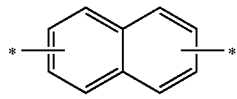
(37)

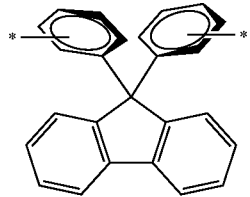
(38)

In formulas (30) to (38),
* represents a bond,
Z$^1$, Z$^2$, and Z$^3$ each independently represent a single bond, —O—, —CH$_2$—, —CH$_2$—CH$_2$—, —CH(CH$_3$)—, —C(CH$_3$)$_2$—, —C(CF$_3$)$_2$—, —SO$_2$—, or —CO—.

One example is that Z$^1$ and Z$^3$ are —O—, and Z$^2$ is —CH$_2$—, —C(CH$_3$)$_2$—, —C(CF$_3$)$_2$—, or —SO$_2$—. Bonding positions of each of Z$^1$ and Z$^2$ to each ring and bonding positions of each of Z$^2$ and Z$^3$ to each ring are preferably a meta- or para-position to each ring.

The polyimide-based resin is preferably a polyamideimide resin having at least repeating structural unit represented by Formula (10) and the repeating structural unit represented by Formula (13) from the viewpoint of easily improving the visibility. In addition, the polyamide-based resin preferably has at least the repeating structural unit represented by Formula (13).

In one embodiment of the present invention, the polyimide-based resin is a condensation type polymer obtained by reacting (polycondensating) a diamine and a tetracarboxylic acid compound (acid chloride compound, tetracarboxylic acid compound analogues such as tetracarboxylic acid dianhydride), and, if necessary, a dicarboxylic acid compound (dicarboxylic acid compound analogues such as an acid chloride compound), a tricarboxylic acid compound (acid chloride compound, tricarboxylic acid compound analogues such as a tricarboxylic acid anhydride) and the like. The repeating structural unit represented by Formula (10) or Formula (11) is usually derived from the diamine and the tetracarboxylic acid compound. The repeating structural unit represented by Formula (12) is usually derived from the diamine and the tricarboxylic acid compound. The repeating structural unit represented by Formula (13) is usually derived from the diamine and the dicarboxylic acid compound.

In one embodiment of the present invention, the polyamide-based resin is the condensation type polymer obtained by reacting (polycondensating) the diamine and the dicarboxylic acid compound. That is, the repeating structural unit represented by Formula (13) is usually derived from the diamine and the dicarboxylic acid compound.

Examples of the tetracarboxylic acid compound include aromatic tetracarboxylic acid compounds such as an aromatic tetracarboxylic acid dianhydride; aliphatic tetracarboxylic acid compounds such as an aliphatic tetracarboxylic acid dianhydride, and the like. The tetracarboxylic acid compound may be used alone or in combination of two or more. The tetracarboxylic acid compound may be tetracarboxylic acid compound analogues such as an acid chloride compound other than a dianhydride.

Specific examples of the aromatic tetracarboxylic acid dianhydride include 4,4'-oxydiphthalic acid dianhydride, 3,3',4,4'-benzophenonetetracarboxylic acid dianhydride, 2,2',3,3'-benzophenonetetracarboxylic acid dianhydride, 3,3',4,4'-biphenyltetracarboxylic acid dianhydride, 2,2',3,3'-biphenyltetracarboxylic acid dianhydride, 3,3',4,4'-diphenylsulfonetetracarboxylic acid dianhydride, 2,2-bis(3,4-dicarboxyphenyl)propane dianhydride, 2,2-bis(2,3-dicarboxyphenyl)propane dianhydride, 2,2-bis(3,4-dicarboxyphenoxyphenyl)propane dianhydride, 4,4'-(hexafluoroisopropylidene)diphthalic dianhydride (6FDA), 1,2-bis(2,3-dicarboxyphenyl)ethane dianhydride, 1,1-bis(2,3-dicarboxyphenyl)ethane dianhydride, 1,2-bis(3,4-dicarboxyphenyl)ethane dianhydride, 1,1-bis(3,4-dicarboxyphenyl)ethane dianhydride, bis(3,4-dicarboxyphenyl)methane dianhydride, bis(2,3-dicarboxyphenyl)methane dianhydride, 4,4'-(p-phenylenedioxy)diphthalic acid dianhydride, and 4,4'-(m-phenylenedioxy)diphthalic acid dianhydride. These can be used alone or in combination of two or more.

The aliphatic tetracarboxylic acid dianhydride includes cyclic or non-cyclic aliphatic tetracarboxylic acid dianhydrides. The cycloaliphatic tetracarboxylic acid dianhydride is a tetracarboxylic acid dianhydride having an alicyclic hydrocarbon structure, and specific examples thereof include cycloalkanetetracarboxylic acid dianhydrides such as 1,2,4,5-cyclohexanetetracarboxylic acid dianhydride, 1,2,3,4-cyclobutanetetracarboxylic acid dianhydride, and 1,2,3,4-cyclopentanetetracarboxylic acid dianhydride, bicyclo[2.2.2]oct-7-ene-2,3,5,6-tetracarboxylic acid dianhydride, dicyclohexyl-3,3',4,4'-tetracarboxylic acid dianhydride, and a regioisomer thereof. These can be used alone or in combination of two or more. Specific examples of the acyclic aliphatic tetracarboxylic acid dianhydrides include 1,2,3,4-butanetetracarboxylic acid dianhydride, 1,2,3,4-pentanetetracarboxylic acid dianhydride and the like, and these can be used alone or in combination of two or more. In addition, the cycloaliphatic tetracarboxylic acid dianhydride and the acyclic aliphatic tetracarboxylic acid dianhydride may be used in combination.

Among the above tetracarboxylic dianhydrides, 1,2,4,5-cyclohexane tetracarboxylic acid dianhydride, bicyclo[2.2.2]oct-7-ene-2,3,5,6-tetracarboxylic acid dianhydride, 4,4'-(hexafluoroisopropylidene) diphthalic dianhydride, and a mixture thereof are preferred, from the viewpoint of easily improving visibility, a modulus of elasticity, and bending resistance and easily reducing colorability. In addition, as the tetracarboxylic acid, a water adduct of an anhydride of the tetracarboxylic acid compound may be used.

Examples of the tricarboxylic acid compounds include aromatic tricarboxylic acid, aliphatic tricarboxylic acid, and acid chloride compounds of analogues thereof, acid anhydrides and the like, and two or more thereof may be used in combination.

Specific examples thereof include anhydrides of 1,2,4-benzenetricarboxylic acid; 2,3,6-naphthalenetricarboxylic acid-2,3-anhydride; and a compound in which phthalic anhydride and benzoic acid are linked by a single bond, —$CH_2$—, —$C(CH_3)_2$—, —$C(CF_3)_2$—, —$SO_2$—, or a phenylene group.

Examples of the tricarboxylic acid compounds include aromatic dicarboxylic acid, aliphatic dicarboxylic acid, and acid chloride compounds of analogues thereof, acid anhydrides and the like, and two or more thereof may be used in combination. Specific examples thereof include terephthalic acid dichloride (terephthaloyl chloride (TPC)); isophthalic acid dichloride; naphthalenedicarboxylic acid dichloride; 4,4'-biphenyldicarboxylic acid dichloride; 3,3'-biphenyldicarboxylic acid dichloride; 4,4'-oxybis(benzoyl chloride) (OBBC); and a dicarboxylic acid compound of a chain hydrocarbon having 8 or less carbon atoms and a compound in which two benzoic acids are linked by a single bond, —$CH_2$—, —$C(CH_3)_2$—, —$C(CF_3)_2$—, —$SO_2$—, or a phenylene group. It is preferred to use these dicarboxylic acid compounds, from the viewpoint of easily improving visibility, a modulus of elasticity, and bending resistance and easily reducing colorability.

Examples of the diamine include an aliphatic diamine, an aromatic diamine, or a mixture thereof. In the present embodiment, the "aromatic diamine" refers to a diamine in which an amino group is directly bonded to an aromatic ring, and a part of the structure thereof may contain an aliphatic group or other substituents. The aromatic ring may be a single ring or a condensed ring, and examples thereof include a benzene ring, a naphthalene ring, an anthracene ring, and a fluorene ring, but are not limited thereto. Among them, the aromatic ring is preferably a benzene ring. In addition, the "aliphatic diamine" refers to a diamine in which an amino group is directly bonded to an aliphatic group, and a part of the structure thereof may contain an aromatic ring or other substituents.

Examples of the aliphatic diamine include acyclic aliphatic diamines such as hexamethylene diamine, cycloaliphatic diamines such as 1,3-bis(aminomethyl)cyclohexane, 1,4-bis(aminomethyl)cyclohexane, norbornane diamine, 4,4'-diaminodicyclohexylmethane and the like. These can be used alone or in combination of two or more.

Examples of the aromatic diamine include aromatic diamines having one aromatic ring such as p-phenylenediamine, m-phenylenediamine, 2,4-toluenediamine, m-xylylenediamine, p-xylylenediamine, 1,5-diaminonaphthalene, and 2,6-diaminonaphthalene; and aromatic diamines having two or more aromatic rings such as 4,4'-diaminodiphenylmethane, 4,4'-diaminodiphenylpropane, 4,4'-diaminodiphenylether, 3,4'-diaminodiphenylether, 3,3'-diaminodiphenylether, 4,4'-diaminodiphenyl sulfone, 3,4'-diaminodiphenyl sulfone, 3,3'-diaminodiphenyl sulfone, 1,4-bis(4-aminophenoxy)benzene, 1,3-bis(4-aminophenoxy)benzene, 4,4'-diaminodiphenyl sulfone, bis[4-(4-aminophenoxy)phenyl]sulfone, bis[4-(3-aminophenoxy) phenyl]sulfone, 2,2-bis[4-(4-aminophenoxy)phenyl]propane, 2,2-bis[4-(3-aminophenoxy)phenyl]propane, 2,2'-dimethylbenzidine, 2,2'-bis(trifluoromethyl)benzidine(2,2'-bis(trifluoromethyl)-4,4'-diaminodiphenyl (TFMB)), 4,4'-bis(4-aminophenoxy)biphenyl, 9,9-bis(4-aminophenyl)fluorene, 9,9-bis(4-amino-3-methylphenyl)fluorene, 9,9-bis(4-amino-3-chlorophenyl)fluorene, and 9,9-bis(4-amino-3-fluorophenyl)fluorene. These can be used alone or in combination of two or more.

Among the above diamines, it is preferred to use one or more selected from the group consisting of aromatic diamines having a biphenyl structure, from the viewpoint of easily improving visibility, a modulus of elasticity, and bending resistance and easily reducing colorability. It is more preferred to use one or more selected from the group consisting of 2,2'-dimethylbenzidine, 2,2'-bis(trifluoromethyl) benzidine, 4,4'-bis(4-aminophenoxy) biphenyl, and 4,4'-diaminodiphenyl ether, and it is still more preferred to use 2,2'-bis(trifluoromethyl) benzidine.

The polyimide-based resin is obtained by mixing the respective raw materials such as the diamine, the tetracarboxylic acid compound, the tricarboxylic acid compound, and the dicarboxylic acid compound according to the conventional method, for example, the methods such as stirring and then imidizing the resulting intermediate under the presence of an imidized catalyst and a dehydrating agent as needed. The polyamide-based resin can be obtained by mixing the respective raw materials such as the diamine and the dicarboxylic acid compound according to the conventional method, for example, the methods such as stirring.

The imidized catalyst used in a imidizing step is not particularly limited, and examples thereof include aliphatic amines such as tripropylamine, dibutylpropylamine and ethyldibutylamine; alicyclic amines (monocyclic) such as N-ethylpiperidine, N-propylpiperidine, N-butylpyrrolidine, N-butylpiperidine, and N-propylhexahydroazepine; alicyclic amines (polycyclic) such as azabicyclo[2.2.1]heptane, azabicyclo[3.2.1]octane, azabicyclo[2.2.2]octane, and azabicyclo[3.2.2]nonane; and aromatic amines such as 2-methylpyridine, 3-methylpyridine, 4-methylpyridine, 2-ethylpyridine, 3-ethylpyridine, 4-ethylpyridine, 2,4-dimethylpyridine, 2,4,6-trimethylpyridine, 3,4-cyclopentenopyridine, 5,6,7,8-tetrahydroisoquinoline and isoquinoline.

The dehydrating agent used in the imidizing step is not particularly limited, but examples thereof include an acetic anhydride, a propionic acid anhydride, an isobutyric acid anhydride, a pivalic acid anhydride, a butyric acid anhydride, an isovaleric acid anhydride and the like.

The reaction temperature in the mixing and imidizing steps of the respective raw materials is not particularly limited, but is, for example, 15 to 350° C. and preferably 20 to 100° C. The reaction time is also not particularly limited, but is, for example, about 10 minutes to 10 hours. If necessary, the reaction may be performed under conditions of inert atmosphere or reduced pressure. In addition, the reaction may be performed in a solvent, and examples of the solvent include those exemplified as the solvent used for the preparation of the varnish. After the reaction, the polyimide-based resin or the polyamide-based resin is purified. Examples of the purification method include a method of adding a poor solvent to a reaction solution to deposit a resin by a reprecipitation, drying the deposited resin, taking out precipitates, and if necessary, washing the precipitates with a solvent such as methanol and drying the precipitates. Note that for the production of the polyimide-based resin, reference may be made to, for example, the production method described in JP-A-2006-199945 or JP-A-2008-163107. In addition, as the polyimide-based resin, commercially available products can also be used, and a specific example of the polyimide-based resin item include neoprim (registered trademark) manufactured by MITSUBISHI GAS CHEMICAL COMPANY, INC., KPI-MX300F manufactured Kawamura Sangyo Co., Ltd., and the like.

In an embodiment of the present invention, in the polyamideimide resin, the content of the structural unit represented by Formula (13) is preferably 0.1 mol or more, more preferably 0.5 mol or more, still more preferably 1.0 mol or more, and particularly preferably 1.5 mol or more and preferably 6.0 mol or less, more preferably 5.0 mol or less, and still more preferably 4.5 mol or less, relative to 1 mol of the structural unit represented by Formula (10). When the content of the structural unit represented by Formula (13) is in the above range, visibility in the wide angle direction, a modulus of elasticity, and bending resistance are easily improved.

The weight average molecular weight of the polyimide-based resin or the polyamide-based resin is preferably 200,000 or more, more preferably 250,000 or more, still more preferably 300,000 or more and preferably 600,000 or less, more preferably 550,000 or less, and still more preferably 500,000 or less. When the weight average molecular weight of the polyimide-based resin or the polyamide-based resin is the above lower limit or higher, it is easy to improve the modulus of elasticity and bending resistance of the optical film. Further, when the weight average molecular weight is the above upper limit or lower, it is easy to reduce the viscosity of the varnish and also it is easy to improve stretchability and processability of the optical film. In addition, the weight average molecular weight can be determined by performing gel permeation chromatography (GPC) measurement and standard polystyrene conversion, and can be calculated, for example, by a method described in the Example.

In a preferred embodiment of the present invention, the polyimide-based resin or the polyamide-based resin contained in the optical film of the present invention may contain a halogen atom such as a fluorine atom which can be introduced, for example, by the fluorine-containing substituent and the like. When the polyimide-based resin or the polyamide-based resin contains a halogen atom, it is easy to improve the modulus of elasticity of the optical film and to reduce the yellow index (YI value). When the modulus of elasticity of the optical film is high, it is easy to suppress occurrence of scratches, wrinkles, or the like in the film, and further, when the yellow index of the optical film is low, it is easy to improve the transparency and visibility of the film. The halogen atom is preferably a fluorine atom. Preferred examples of the fluorine-containing substituent in order to make the polyimide-based resin or the polyamide-based resin contain the fluorine atom include a fluoro group and a trifluoromethyl group.

In the polyimide-based resin or the polyamide-based resin, the content of the halogen atom is preferably 1 to 40% by mass, more preferably 5 to 40% by mass, and still more preferably 5 to 30% by mass, based on the mass of the polyimide-based resin or the polyamide-based resin. When the content of the halogen atom is the above lower limit or higher, the modulus of elasticity of the optical film is more improved, a water absorption is lowered, the yellow index (YI value) is more reduced, and the transparency and visibility is more easily improved. When the content of the halogen atom is the above upper limit or lower, synthesis is easy.

The imidization rate of the polyimide-based resin in the optical film is preferably 90% or more, more preferably 95% or more, and still more preferably 98% or more. It is preferred that the imidization rate is the above lower limit or higher, from the viewpoint of improving the flatness and the visibility in the wide angle direction of the optical film. Further, the upper limit of the imidization rate is 100% or less. In addition, the imidization rate can be determined by an IR method, an NMR method, or the like, for example, by a method described in the Example.

In an embodiment of the present invention, the content of the polyimide-based resin and/or the polyamide-based resin in the optical film is preferably 40% by mass or more, more preferably 50% by mass or more, still more preferably 70% by mass or more, particularly preferably 80% by mass or more, and most preferably 90% by mass or more, relative to a mass of the optical film. It is advantageous that the content of the polyimide-based resin and/or the polyamide-based resin is the above lower limit or higher, from the viewpoint of the visibility in the wide angle direction, modulus of elasticity, and bending resistance. In addition, the content of the polyimide-based resin and/or the polyamide-based resin in the optical film is usually 100% by mass or less relative to the mass of the optical film.

As a resin included in the optical film, two or more polyimide-based resins and/or two or more polyamide-based resins may be used or a combination of the polyimide-based resin and the polyamide-based resin may be used.

In order to obtain an optical film having a low scattered light ratio, it is preferred to apply a varnish having specific solid content concentration and viscosity on a substrate in an application step described later to form a uniform coating film. In an embodiment of the present invention, it is preferred to use two or more polyimide-based resins or polyamide-based resins, for example, two or more polyimide-based resins, two or more polyamide-based resins, a combination of one or more polyimide-based resins and one or more polyamide-based resin, or the like, and in particular, it is more preferred to use two or more polyimide-based resins or polyamide-based resin having weight average molecular weights different from each other. In the application step described later, when such a resin is included in the varnish, the solid content concentration and viscosity of the varnish is easily adjusted to a certain range, and thus, a uniform coating film can be formed, and the resulting optical film can be easily adjusted to satisfy Formula (1).

In a preferred embodiment of the present invention, in two or more polyimide-based resins or polyamide-based resins having different weight average molecular weight from each other, the weight average molecular weight of at least one polyimide-based resin or polyamide-based resin is 250,000 to 500,000, and the weight average molecular weight of at least one of the polyimide-based resin or polyamide-based resin is 200,000 to 450,000. Further, in a more preferred embodiment of the present invention, in two polyimide-based resins or polyamide-based resins having different weight average molecular weights, the weight average molecular weight of one polyimide-based resin or polyamide-based resin is 250,000 to 500,000, and the weight average molecular weight of the other polyimide-based resin or polyamide-based resin is 200,000 to 450,000. In the application step described later, when such a resin is included in the varnish, the solid content concentration and viscosity of the varnish is easily adjusted to a certain range, and thus, a uniform coating film can be formed, and the resulting optical film can be easily adjusted to satisfy Formula (1).

Further, the mass ratio of one polyimide-based resin or polyamide-based resin to the other polyimide-based resin or polyamide-based resin (the former/the latter) is can be appropriately selected depending on the type of resin, the solid content concentration and viscosity of the desired varnish, and the like, and may be, for example, 5/95 to 95/5.

<Additive>

The optical film of the present invention may further include an ultraviolet absorbent. For example, examples of the ultraviolet absorbent include a triazine-based ultraviolet absorbent, a benzophenone-based ultraviolet absorbent, a benzotriazole ultraviolet absorbent, a cyanoacrylate ultraviolet absorbent, and the like. These may be used alone or in combination of two or more. Examples of the appropriate ultraviolet absorbent commercially available include Sumibarb (registered trademark) 340 manufactured by Sumika Chemtex Co., Ltd., Adekastab (registered trademark) LA-31 manufactured by ADEKA Co., Ltd., and Tinuvin (registered trademark) 1577 manufactured by BASF Japan Co. Ltd, and the like. When the ultraviolet absorbent is included, deterioration of the resin in the optical film is suppressed, and thus, it is easy to enhance the optical characteristics of the optical film. The content of the ultraviolet absorbent is preferably 1 to 10% by mass, and more preferably 3 to 6% by mass, relative to the mass of the optical film of the present invention. When the content of the ultraviolet absorbent is in the above range, it is easier to improve the optical characteristics of the optical film.

The optical film of the present invention may further include other additives other than ultraviolet absorbent. Examples of such other additives include a filler, a brightener, an antioxidant, a pH adjusting agent, a leveling agent, and the like. However, it is preferable that the optical film of the present invention is substantially free of a filler (for example, silica particles). Specifically, the content of the filler is preferably 5% by mass or less, more preferably 3% by mass or less, still more preferably 1% by mass or less, particularly preferably 0.5% by mass or less, and most preferably 0.1% by mass or less, relative to the mass of the optical film.

The applications of the optical film of the present invention are not particularly limited, and the optical film may be used for various applications. The optical film of the present invention may be a single layer or a laminate as described above, and the optical film of the present invention may be used as it is or may be used as a laminate with other films. Note that when the optical film is a laminate, the optical film is referred to as an optical film including all layers laminated on one surface or both surfaces of the optical film.

When the optical film of the present invention is a laminate, it is preferred to have one or more functional layers on at least one surface of the optical film. Examples of the functional layer include an ultraviolet absorbing layer, a hard coat layer, a primer layer, a gas barrier layer, a pressure-sensitive adhesive layer, a hue adjusting layer, a refractive index adjusting layer, and the like. The functional layer can be used alone or in combination of two or more.

The ultraviolet absorbing layer is a layer having an ultraviolet absorbing function, and is formed from a main material selected from an ultraviolet curable transparent resin, an electron beam curable transparent resin, and a thermally curable transparent resin, and an ultraviolet absorbent dispersed in the main material.

The pressure-sensitive adhesive layer is a layer having a pressure-sensitive adhesive function, and has a function of adhering the optical film to other members. As a forming material of the pressure-sensitive adhesive layer, usually known materials can be used. For example, a thermally curable resin composition or a photocurable resin composition can be used. In this case, energy is supplied in an ex-post manner, whereby the thermally curable resin composition or the photocurable resin composition can be polymerized and cured.

The pressure-sensitive adhesive layer is a layer attached to an object by pressing, which is called a pressure sensitive adhesive (PSA). The pressure sensitive adhesive may be a pressure-sensitive adhesive which is "a material having pressure-sensitive adhesiveness at room temperature and adhered to an adherend with light pressure" (JIS K 6800), or may be a capsule type adhesive which is "an adhesive which contains certain components in a protective film (microcapsule) and can maintain stability until the coated film is broken by appropriate means (pressure, heat, and the like)" (JIS K 6800).

The hue adjusting layer is a layer having a hue adjustment function and a layer capable of adjusting the optical laminate to have a desired hue. The hue adjusting layer is, for example, a layer containing a resin or a colorant. Examples of the colorant include inorganic pigments such as titanium oxide, zinc oxide, Bengal red, a calcined titanium oxide-based pigment, ultramarine blue, cobalt aluminate, and carbon black; organic pigments such as an azo-based compound, a quinacridone-based compound, an anthraquinone-based compound, a perylene-based compound, an isoindolinone-based compound, a phthalocyanine-based compound, a quinophthalone-based compound, a threne-based compound, and a diketopyrrolopyrroles-based compound; extender pigments such as barium sulfate and calcium carbonate; and dyes such as a basic dye, an acidic dye, and a mordant dye.

The refractive index adjusting layer is a layer having a refractive index adjustment function, and is, for example, a layer having a refractive index different from that of a single layer optical film and capable of imparting a predetermined refractive index to the optical film. The refractive index adjusting layer may be, for example, an appropriately selected resin and a resin layer optionally further containing a pigment, or may be a metal thin film. Examples of the pigment adjusting a refractive index include silicon oxide, aluminum oxide, antimony oxide, tin oxide, titanium oxide, zirconium oxide, and tantalum oxide. The average primary particle size of the pigment may be 0.1 µm or less. By having the average primary particle size of the pigment of 0.1 µm or less, diffuse reflection of light transmitted through the refractive index adjusting layer can be prevented, and a decrease in transparency can be prevented. Examples of the metal used in the refractive index adjusting layer include metal oxides or metal nitrides such as titanium oxide, tantalum oxide, zirconium oxide, zinc oxide, tin oxide, silicon oxide, indium oxide, titanium oxynitride, titanium nitride, silicon oxynitride, and silicon nitride.

In a preferred embodiment of the present invention, the optical film has a hard coat layer on at least one surface (one surface or both surfaces). When the hard coat layer is provided on both surfaces of the optical film, the two hard coat layers may contain the same or different components.

Examples of the hard coat layer include the well-known hard coat layers, such as an acrylic-based layer, an epoxy-based layer, a urethane-based layer, a benzyl chloride-based layer, and a vinyl-based layer. Among them, a hard coat layer of an acryl-based layer, a urethane-based layer, and a combination thereof can be preferably used, from the viewpoint of suppressing a decrease in visibility in the wide angle direction of the optical film and also improving bending resistance. The hard coat layer is preferably a cured product of a curable composition containing a curable compound, and is formed by polymerizing the curable compound by irradiation with active energy rays. Examples of the curable compound include polyfunctional (meth)acrylate-based compound. The polyfunctional (meth)acrylate-based compound is a compound having at least two (meth)acryloyl groups in the molecule.

Examples of the polyfunctional (meth)acrylate-based compound include ethylene glycol di(meth)acrylate, diethylene glycol di(meth)acrylate, 1,6-hexanediol di(meth)acrylate, neopentyl glycol di(meth)acrylate, trimethylol propane tri(meth)acrylate, trimethylol ethane tri(meth)acrylate, tetramethylol methane tri(meth)acrylate, tetramethylol methane tetra(meth)acrylate, pentaglycerol tri(meth)acrylate, pentaerythritol tri(meth)acrylate, pentaerythritol tetra(meth)acrylate, glycerin tri(meth)acrylate, dipentaerythritol tri(meth)acrylate, dipentaerythritol tetra(meth)acrylate, dipentaerythritol penta(meth)acrylate, dipentaerythritol hexa(meth)acrylate, tris((meth)acryloyloxyethyl)isocyanurate; a phosphazene-based (meth)acrylate compound having a (meth)acryloyl group introduced into the phosphazene ring of the phosphazene compound; a urethane (meth)acrylate compound obtained by reaction of polyisocyanate having at least two isocyanate groups in the molecule with a polyol compound having at least one (meth)acryloyl group and hydroxyl group in the molecule; a polyester (meth)acrylate compound obtained by reaction of a polyol compound having at least two carboxylic acid halide and at least one (meth)acryloyl group and hydroxyl group in the molecule; oligomers such as a dimer and a trimer of each of the compounds, and the like. These compounds may each be used alone or in combination of two or more.

The curable compound may contain monofunctional (meth)acrylate-based compounds in addition to the polyfunctional (meth)acrylate-based compounds. Examples of the monofunctional (meth)acrylate-based compounds include hydroxyethyl (meth)acrylate, 2-hydroxyethyl (meth)acrylate, 2-hydroxypropyl (meth) acrylate, hydroxybutyl (meth)acrylate, 2-hydroxy-3-phenoxypropyl (meth)acrylate, glycidyl (meth)acrylate and the like. These compounds may be used alone or in combination of two or more. The content of the monofunctional (meth)acrylate-based compound is preferably 10% by mass or less when the solid content of the compound contained in the curable composition is 100% by mass. In addition, in the present specification, the solid content means all components except the solvent contained in the curable composition.

Further, the curable compound may contain a polymerizable oligomer. A hardness of the hard coat layer can be adjusted by containing the polymerizable oligomer. Examples of the polymerizable oligomers can include a macromonomer such as terminal (meth)acrylate polymethyl methacrylate, terminal styryl poly (meth)acrylate, terminal (meth)acrylate polystyrene, terminal (meth)acrylate polyethylene glycol, a terminal (meth)acrylate acrylonitrile-styrene copolymer, and a terminal (meth)acrylate styrene-methyl (meth)acrylate copolymer. The content of the polymerizable oligomer is preferably 5 to 50% by mass when the solid content of the compound contained in the curable composition is 100% by mass.

The curable composition which forms the hard coat layer may contain additives, in addition to the polyfunctional (meth)acrylate-based compounds and a polymerizable oligomer. Examples of the additives include a polymerization initiator, silica, a leveling agent, a solvent and the like. Examples of the solvent include methyl ethyl ketone, polypropylene glycol monomethyl ether and the like.

The thickness of the hard coat layer is preferably 3 to 30 µm, more preferably 5 to 25 µm, and still more preferably 5 to 20 µm, from the viewpoint of improving hardness, bending resistance, and visibility of the optical film.

In one embodiment of the present invention, the optical film may have a protective film on at least one surface (one surface or both surfaces). For example, when a functional layer is provided on one surface of the optical film, the protective film may be laminated on the surface on the optical film or the surface on the functional layer, and laminated on both surfaces of the optical film and the functional layer. When the functional layers are provided on both surfaces of the optical film, the protective film may be laminated on the surface on one functional layer, or may be laminated on the surfaces on both functional layers. The protective film is a film for temporarily protecting the surface of the optical film or the functional layer, and is not particularly limited as long as it is a peelable film capable of protecting the surface of the optical film or the functional layer. Examples of the protective film include polyester-based resin films such as polyethylene terephthalate, polybutylene terephthalate, and polyethylene naphthalate, polyolefin-based resin films such as polyethylene and polypropylene films, acrylic-based resin films and the like, and is preferably selected from the group consisting of the polyolefin-based resin films, the polyethylene terephthalate-based resin films, and the acrylic-based resin films. When the optical film has two protective films, each protective film may be the same or different.

The thickness of the protective film is not particularly limited, but is usually 10 to 120 μm, preferably 15 to 110 μm, and more preferably 20 to 100 μm. When the optical film has two protective films, the thickness of each protective film may be the same or different.

[Production Method of Optical Film]

The optical film of the present invention can be produced, for example, by a method including the following steps, but not limited thereto,
(a) preparing a solution containing the above resins (hereinafter, referred to as a varnish) (a varnish preparation step),
(b) applying the varnish on a substrate to form a coating film (an application step), and
(c) drying the applied solution (coating film) to form the optical film (an optical film forming step).

In the step of preparing a varnish, the resin is dissolved in a solvent, and if necessary, the above ultraviolet absorbent and the above other additives are added and mixed with stirring, thereby preparing the varnish.

The solvent used for the preparation of the varnish is not particularly limited as long as the resin can be dissolved. Examples of such solvent include amide-based solvents such as N,N-dimethylacetamide (DMAc) and N,N-dimethylformamide; lactone-based solvents such as γ-butyrolactone (GBL) and γ-valerolactone; sulfur-containing-based solvents such as dimethylsulfone, dimethylsulfoxide, and sulfolane; carbonate-based solvents such as ethylene carbonate and propylene carbonate; and combinations thereof (mixed solvents). Among them, the amide-based solvents or the lactone-based solvents are preferable. These solvents can be used alone or in combination of two or more. In addition, the varnish may also contain water, an alcohol-based solvent, a ketone-based solvent, an acyclic ester-based solvent, an ether-based solvent and the like. The solid content concentration of the varnish is preferably 1 to 25% by mass and more preferably 5 to 20% by mass.

In the application step, the varnish is applied to the substrate by the known application method to form a coating film. Examples of the known application method include a wire bar coating method, a roll coating method such as reverse coating and gravure coating, a die coating method, a comma coating method, a lip coating method, a spin coating method, a screen coating method, a fountain coating method, a dipping method, a spray method, a casting forming method, and the like.

Examples of the substrate include a SUS plate if the substrate is a metal-based substrate, and a PET film, a PEN film, another polyimide-based resin or a polyamide-based resin film, a cycloolefin-based polymer (COP) film, acrylic-based film and the like if the substrate is a resin-based substrate. Among them, a PET film, a COP film, and the like are preferred from the viewpoint of excellent smoothness and thermal resistance, and a PET film is more preferred from the viewpoint of the close adhesion and cost of the optical film.

In the step of forming an optical film, the coating film is dried (referred to as first drying) and peeled from the substrate, and then the dried coating film is further dried (referred to as second drying or post bake treatment), thereby forming the optical film. The first drying may be carried out under the conditions of inert atmosphere or reduced pressure, as necessary. The first drying is preferably performed at a relatively low temperature over time. When the first drying is performed at a relatively low temperature over time, it is easy for the scattered light ratio of the resulting optical film to satisfy Formula (1).

Here, when the optical film of the present invention is industrially produced, the actual production environment is often disadvantageous for obtaining a low scattered light ratio Ts as compared with the production environment in a laboratory level, and as a result, it may be difficult to increase wide angle visibility of the optical film. As described above, it is preferred to perform the first drying at a relatively low temperature over time, but since at a laboratory level, when the first drying is performed, since the drying can be performed in a closed drier, the surface of the optical film is relatively less likely to be roughened due to external factors. In contrast, when the optical film is industrially produced, since, for example, it is necessary to heat a large area in the first drying, an air blower may be used at the time of heating. As a result, the surface state of the optical film is easily roughened, and it is difficult to decrease the scattered light ratio Ts of the optical film.

When drying is performed by heating, considering, in particular, the above external factors at the time of industrial production of the optical film, a temperature of the first drying is preferably 60 to 150° C., more preferably 60 to 140° C., and still more preferably 70 to 140° C. The first drying time is preferably 1 to 60 minutes and more preferably 5 to 40 minutes. Considering in particular the above external factors at the time of industrial production of the optical film, it is preferred to perform drying under three or more stages of drying temperature conditions. The drying can be performed at the same or different temperature conditions and/or drying time in each stage under the multi-stage condition, and the drying may be performed in, for example, 3 to 10 stages and preferably 3 to 8 stages. When the first drying is carried out under multi-stage conditions of three or more stages, it is easy for the resulting optical film to satisfy Formula (1). In a mode under the multi-stage condition of three or more stages, it is preferable that a temperature profile of the first drying includes temperature rising and temperature falling. That is, it is more preferred that first drying conditions in the step of forming an optical film are three or more heating temperature conditions in which a temperature profile includes a temperature increase and a temperature decrease. Describing the case of a fourth stage as such a temperature profile as an example, the first drying temperature is 70 to 90° C. (first temperature), 90 to 120° C. (second temperature), 80 to 120° C. (third temperature), and 80 to 100° C. (fourth temperature) in order. In this example, the first drying temperature rises from a first temperature to a second temperature, and then falls from the second temperature to a third temperature, and further falls from the third temperature to a fourth temperature. Here, the first drying time is, for example, 5 to 15 minutes in each stage. The first drying is preferably performed so that the residual amount of solvent of the dried coating film is preferably 5 to 15% by mass, more preferably 6 to 12% by mass relative to the mass of the dried coating film. When the residual amount of the solvent is in the above range, reliability of the dried coating film from the substrate is good and it is easy for the resulting optical film to satisfy Formula (1).

A temperature of the second drying is preferably 150 to 300° C., more preferably 180 to 250° C., and still more preferably 180 to 230° C. The second drying time is preferably 10 to 60 minutes and more preferably 30 to 50 minutes.

The second drying may be performed in a single wafer manner, but in the case of industrial production, the second drying may be performed by a roll-to-roll method from the viewpoint of production efficiency. In the single wafer type, it is preferable to perform the drying in a state of being uniformly stretched in an in-plane direction.

In the roll-to-roll method, it is preferred to dry the dried coating film in a state of stretching the coating film in a transport direction, from the viewpoint that the optical film easily satisfies Formula (1), and the transport speed is preferably 0.1 to 5 m/min, more preferably 0.5 to 3 m/min, and still more preferably 0.7 to 1.5 m/min. The second drying may be carried out under one stage or multi-stage conditions, and it is preferred to perform drying under multi-stage conditions, from the viewpoint that the optical film easily satisfies Formula (1). The multi-stage conditions can be carried out preferably under at least one selected from the same or different temperature conditions, drying time, and a wind speed of hot air in each stage, and for example, drying may be performed in 2 to 10 stages, and preferably 3 to 8 stages. Further, in each stage, the wind speed of hot air is preferably 5 to 20 m/min, more preferably 10 to 15 m/min, and still more preferably 11 to 14 m/min, from the viewpoint that the resulting optical film easily satisfies Formula (1).

When the optical film of the present invention is provided with the hard coat layer, the hard coat layer can be formed, for example, by applying a curable composition on at least one surface of the optical film to form a coating film, irradiating high energy ray to the coating film, and curing the coating film.

Examples of the application method include known application methods exemplified above. An irradiation intensity in high energy rays (for example, an active energy ray) at the time of curing is appropriately determined depending on the composition of the curable composition and is not particularly limited, but irradiation in a wavelength region effective for activating a polymerization initiator is preferred. The irradiation intensity is preferably 0.1 to 6,000 mW/cm$^2$, more preferably 10 to 1,000 mW/cm$^2$, and still more preferably 20 to 500 mW/cm$^2$. If the irradiation intensity is in the above range, an appropriate reaction time can be secured, and yellowing or deterioration of a resin due to heat radiated from the light source and heat generated at the time of the curing reaction can be suppressed. The irradiation time may be appropriately selected depending on the composition of the curable composition, and is not particularly limited, but an accumulated amount of light which is represented as a product of the irradiation intensity and the irradiation time is preferably 10 to 10,000 mJ/cm$^2$, more preferably 50 to 1,000 mJ/cm$^2$, and still more preferably 80 to 500 mJ/cm$^2$. If the accumulated amount of light is in the above range, a sufficient amount of active species derived from the polymerization initiator can be generated to allow the curing reaction to proceed more reliably, and furthermore, the irradiation time does not become too long and good productivity can be achieved. Further, it is useful since the hardness of the hard coat layer can be further increased by the irradiation step in this range. From the viewpoint of improving the smoothness of the hard coat layer and further improving the visibility of the optical film in the wide angle direction, there is a need to optimize the type of solvent, the component ratio, and the solid content concentration and add the leveling agent and the like.

[Flexible Image Display Device]

The present invention includes a flexible display device including the optical film. The optical film of the present invention is preferably used as the front plate in the flexible image display device, and the front plate is referred to as a window film. The flexible image display device includes a laminate for a flexible image display device and an organic EL display panel, and the laminate for a flexible image display device is disposed on a viewing side of an organic EL display panel and is configured to be foldable. The laminate for a flexible image display device may further include a polarizing plate, preferably a circular polarizing plate, and a touch sensor, and though the lamination order is optional, it is preferred that the window film, the polarizing plate, and the touch sensor, or the window film, the touch sensor, and the polarizing plate are layered in this order from a viewing side. If the polarizing plate is present on the viewing side of the touch sensor, a pattern of the touch sensor is less likely to be recognized visually, and the visibility of the displayed image is improved, which is preferable. Each member can be laminated using an adhesive, a pressure-sensitive adhesive or the like. In addition, the light shielding pattern may be provided on at least one surface of any layer of the window film, the polarizing plate, and the touch sensor.

[Polarizing Plate]

It is preferred that the flexible display device of the present invention includes a polarizing plate, in particular, a circular polarizing plate, as described above. The circular polarizing plate is a functional layer having a function of transmitting only the right or left circularly polarized light component by laminating a λ/4 retardation plate on a linear polarizing plate. For example, the circular polarizing plate converts external light into right circularly polarized light and reflects the external light from the organic EL panel to shield left circularly polarized external light, and transmits only a luminescence component of the organic EL to suppress the influence of the reflected light, thereby making an image easy to see. In order to achieve the circular polarization function, an absorption axis of the linear polarizing plate and a slow axis of the λ/4 retardation plate theoretically need to be 45°, but practically 45±10°. The linear polarizing plate and the λ/4 retardation plate do not necessarily have to be laminated adjacent to each other as long as the relationship between the absorption axis and the slow axis satisfies the above-mentioned range. It is preferable to achieve complete circular polarization in the entire wavelength, but the circular polarizing plate in the present invention also includes an elliptically polarizing plate because it is not always necessary in practice. It is also preferable to improve the visibility in a state where polarized sunglasses are worn by further laminating the λ/4 retardation film on the viewing side of the linear polarizing plate and converting the emitted light into the circularly polarized light.

The linear polarizing plate is a functional layer which transmits light vibrating in a transmission axis direction but shields polarized light having a vibrational component vertical thereto. The linear polarizing plate may be configured to include a linear polarizer alone or a protective film attached to the linear polarizer and at least one surface thereof. The thickness of the linear polarizing plate may be 200 μm or less, and preferably 0.5 to 100 μm. If the thickness of the linear polarizing plate is in the above range, the flexibility of the linear polarizing plate is less likely to be reduced.

The linear polarizer may be a film type polarizer produced by dyeing and stretching a polyvinyl alcohol (hereinafter, sometimes abbreviated as PVA)-based film. A dichroic pigment such as iodine is adsorbed into a PVA-based film aligned by stretching, or stretched with being adsorbed to PVA, such that the dichroic pigment is aligned and exhibits polarization performance. The production of the film type polarizer may include other steps such as swelling, crosslinking with boric acid, washing with an aqueous solution, and drying. The stretching or dyeing steps may be performed with the PVA-based film alone, or may be performed in a state where the PVA-based film is laminated with another film such as polyethylene terephthalate. The thickness of the PVA-based film to be used is preferably 10 to 100 μm, and the stretching ratio is preferably 2 to 10 times.

Furthermore, another example of the polarizer includes a liquid crystal application type polarizer which is formed by applying a liquid crystal polarizing composition. The liquid crystalline polarizing composition can include a liquid crystalline compound and a dichroic pigment compound. The liquid crystalline compound only needs to have the property of exhibiting a liquid crystal state, and is preferable because it can exhibit high polarization performance particularly when it has a high-order alignment state such as a smectic phase. In addition, the liquid crystalline compound preferably has a polymerizable functional group.

The dichroic pigment compound is a pigment which exhibits dichroism by being aligned with the liquid crystal compound, and may have a polymerizable functional group, and the dichroic pigment itself may have liquid crystallinity.

Any of the compounds contained in the liquid crystal polarizing composition has the polymerizable functional group. The liquid crystal polarizing composition can further contain an initiator, a solvent, a dispersant, a leveling agent, a stabilizer, a surfactant, a crosslinking agent, a silane coupling agent and the like.

A liquid crystal polarizing layer is produced by applying the liquid crystal polarizing composition on an alignment film to form the liquid crystal polarizing layer. The liquid crystal polarizing layer can be formed thinner than a film type polarizer, and the thickness thereof is preferably 0.5 to 10 μm and more preferably 1 to 5 μm.

The alignment film is produced, for example, by applying an alignment film forming composition on a substrate and imparting alignment by rubbing, irradiation with polarized light and the like. The alignment film forming composition may contain an aligning agent, and may further contain a solvent, a crosslinking agent, an initiator, a dispersant, a leveling agent, a silane coupling agent and the like. Examples of the aligning agent include polyvinyl alcohols, polyacrylates, polyamic acids, and polyimides. In the case of using the aligning agent which imparts alignment by the polarized light irradiation, it is preferable to use an aligning agent containing a cinnamate group. The weight average molecular weight of the polymer used as the aligning agent is, for example, about 10,000 to 1,000,000. The thickness of the alignment film is preferably 5 to 10,000 nm, and more preferably 10 to 500 nm in that an alignment control force is sufficiently exhibited.

The liquid crystal polarizing layer can be peeled off from the substrate, transferred and laminated, or the substrate can be laminated as it is. It is also preferable that the substrate plays a role as a protective film, a retardation plate, and a transparent substrate of a window film.

As the protective film, a transparent polymer film may be used, and the same materials and additives as those used for the transparent substrate of the window film can be used. In addition, the protective film may be a coating type protective film obtained by applying and curing a cationic curing composition such as an epoxy resin or a radical curing composition such as acrylate. If necessary, the protective film may include a plasticizer, an ultraviolet absorbent, an infrared absorber, a colorant such as a pigment or a dye, a fluorescent brightener, a dispersant, a heat stabilizer, a light stabilizer, an antistatic agent, an antioxidant, a lubricant, a solvent and the like. The thickness of the protective film is preferably 200 μm or less and more preferably 1 to 100 μm. If the thickness of the protective film is in the above range, the flexibility of the film is less likely to be reduced.

The λ/4 retardation plate is a film which gives a retardation of λ/4 in a direction (in-plane direction of the film) orthogonal to a traveling direction of incident light. The λ/4 retardation plate may be a stretching type retardation plate produced by stretching a polymer film such as a cellulose-based film, an olefin-based film, or a polycarbonate-based film. If necessary, the λ/4 retardation plate may include a phase difference conditioner, a plasticizer, an ultraviolet absorbent, an infrared absorber, a colorant such as a pigment or a dye, a fluorescent brightener, a dispersant, a heat stabilizer, a light stabilizer, an antistatic agent, an antioxidant, a lubricant, a solvent and the like.

The thickness of the stretching type retardation plate is preferably 200 μm or less and more preferably 1 to 100 μm. If the thickness of the stretching type retardation plate is in the above range, the flexibility of the stretching type retardation plate is less likely to be reduced.

In addition, another example of the λ/4 retardation plate includes a liquid crystal application type retardation plate which is formed by coating a liquid crystal composition.

The liquid crystal composition contains a liquid crystal compound exhibiting a liquid crystal state such as nematic, cholesteric, and smectic. The liquid crystal compound has a polymerizable functional group.

The liquid crystal composition can further contain an initiator, a solvent, a dispersant, a leveling agent, a stabilizer, a surfactant, a crosslinking agent, a silane coupling agent and the like.

Similar to the liquid crystal polarizing layer, the liquid crystal application type retardation plate can be produced by applying and curing a liquid crystal composition on a base to form a liquid crystal retardation layer. The liquid crystal application type retardation plate can be formed thinner than the stretching type retardation plate. The thickness of the liquid crystal polarizing layer is preferably 0.5 to 10 μm and more preferably 1 to 5 μm.

The liquid crystal application type retardation plate can be peeled off from the substrate, transferred and laminated, or the substrate can be laminated as it is. It is also preferable that the substrate plays a role as a protective film, a retardation plate, and a transparent substrate of a window film.

In general, there are many materials that exhibit greater birefringence at shorter wavelengths and smaller birefringence at longer wavelengths. In this case, since it is not possible to achieve a phase difference of λ/4 in the entire visible light region, the in-plane phase difference is designed to be preferably 100 to 180 nm and more preferably 130 to 150 nm so that it is λ/4 in the vicinity of 560 nm at which visibility is high. An inverse dispersion λ/4 retardation plate using a material having birefringence wavelength dispersion characteristics opposite to normal characteristics is preferable in that the visibility is good. As such a material, for example, the stretching type retardation plate can use those described in JP-A-2007-232873 and the like and liquid crystal application type retardation plate can use those described in JP-A-2010-30979 and the like.

In addition, as another method, there is also known a technology of obtaining a wide band λ/4 retardation plate by combining with a λ/2 retardation plate (for example, JP-A-10-90521 and the like). The λ/2 retardation plate is also produced by the same material and method as the λ/4 retardation plate. Although the combination of the stretching type retardation plate and the liquid crystal application type retardation plate is optional, both the stretched retardation plate and the liquid crystal application type retardation plate can use the liquid crystal application type retardation plate to have a thin thickness.

There is known a method of laminating a positive C plate on a circular polarizing plate in order to enhance visibility in an oblique direction (for example, JP-A-2014-224837). The positive C plate may be a liquid crystal application type retardation plate or a stretching type retardation plate. The retardation in the thickness direction of the retardation plate is preferably −200 to −20 nm and more preferably −140 to −40 nm.

[Touch Sensor]

As described above, the flexible display device of the present invention includes a touch sensor. The touch sensor is used as an input unit. Examples of the touch sensor includes various types such as a resistive film type, a surface acoustic wave type, an infrared type, an electromagnetic induction type, and a capacitance type, and preferably, the touch sensor uses the capacitance type.

The capacitance type touch sensor is divided into an active area and a non-active area located at an outer portion of the active area. The active area which is an area corresponding to an area (display portion) in which a screen is displayed on a display panel is an area in which a user's touch is sensed, and the non-active area is an area corresponding to an area (non-display portion) in which the screen is not displayed on the display device. The touch sensor can include a substrate having flexible characteristics, a sensing pattern formed on an active area of the substrate, and each sensing line which is formed in a non-active area of the substrate and connected to external driving circuits via the sensing pattern and a pad portion. As a substrate having a flexible property, the same material as the transparent substrate of the window film can be used.

The sensing pattern may include a first pattern formed in a first direction and a second pattern formed in a second direction. The first pattern and the second pattern are arranged in different directions from each other. The first pattern and the second pattern are formed on the same layer, and in order to sense the touched point, the respective patterns need to be electrically connected to each other. The first pattern has a form in which a plurality of unit patterns are connected to each other through a joint, but the second pattern has a structure in which a plurality of unit patterns are separated from each other in an island form, and therefore a separate bridge electrode is required to make the electrical connection of the second pattern. A well-known transparent electrode can be applied to the electrode for connection of the second pattern. Examples of materials for the transparent electrode include indium tin oxide (ITO), indium zinc oxide (IZO), zinc oxide (ZnO), indium zinc tin oxide (IZTO), indium gallium zinc oxide (IGZO), cadmium tin oxide (CTO), poly(3,4-ethylenedioxythiophene) (PEDOT), carbon nanotubes (CNT), graphene, metal wires and the like, and preferably, the ITO is used. These can be used alone or in combination of two or more. The metal used in the metal wire is not particularly limited, and examples thereof include silver, gold, aluminum, copper, iron, nickel, titanium, selenium, chromium, and the like, and these can be used alone or in combination of two or more.

The bridge electrode may be formed on the insulating layer via an insulating layer on the sensing pattern, and the bridge electrode may be formed on the substrate, and the insulating layer and the sensing pattern may be formed thereon. The bridge electrode may be formed of the same material as the sensing pattern, and may be formed of molybdenum, silver, aluminum, copper, palladium, gold, platinum, zinc, tin, titanium or an alloy of two or more thereof.

Since the first pattern and the second pattern need to be electrically isolated, an insulating layer is formed between the sensing pattern and the bridge electrode. The insulating layer can be formed only between the joint of the first pattern and the bridge electrode, or can be formed as a layer covering the entire sensing pattern. In the case of a layer covering the entire sensing pattern, the bridge electrode can connect the second pattern via a contact hole formed on the insulating layer.

The touch sensor can include an optical control layer, which is disposed between the substrate and the electrode, as means for appropriately compensating for a difference in transmittance between the pattern area in which the sensing pattern is formed and the non-pattern area in which the sensing pattern is not formed, and specifically, a difference in light transmittance occurring due to the difference in refractive index in these areas. The optical control layer can include an inorganic insulating material or an organic insulating material. The optical control layer can be formed by coating a photocurable organic pattern and a photocurable composition containing a solvent on the substrate. The photocurable composition can further include inorganic particles. The refractive index of the optical control layer can be increased by the inorganic particles.

A photocurable organic binder can contain a copolymer of each monomer such as an acrylate-based monomer, a styrene-based monomer, and a carboxylic acid-based monomer, in the range which the effect of the present invention is not impaired. The photocurable organic binder may be, for example, a copolymer including mutually different repeating units such as an epoxy group-containing repeating unit, an acrylate repeating unit, and a carboxylic acid repeating unit.

Examples of the inorganic particles include zirconia particles, titania particles, and alumina particles and the like.

The photocurable composition may further include various additives such as a photopolymerization initiator, a polymerizable monomer, and a curing assistant.

[Adhesive Layer]

Each layer (window film, circular polarizing plate, and touch sensor) forming the laminate for the flexible image display device and the film members (linear polarizing plate, λ/4 retardation plate and the like) constituting each layer can be bonded by an adhesive. Examples of the adhesive include commonly used adhesives and the like such as an aqueous adhesive, an aqueous solvent volatilization type adhesive, an organic solvent type, a solvent-free adhesive, a solid adhesive, a solvent volatilization type adhesive, a moisture-curing type adhesive, a heat-curing type adhesive, an anaerobic curing type, an active energy ray curing type adhesive, a curing agent mixed type adhesive, a heat melting type adhesive, a pressure sensitive type adhesive (pressure sensitive adhesive), and a remoistening type adhesive, and preferably, the aqueous solvent volatilization type adhesive, the active energy ray curing type, and the adhesive can be used. A thickness of the adhesive layer can be appropriately controlled according to the required adhesive force and the like, and is preferably 0.01 to 500 μm and more preferably 0.1 to 300 μm. Although a plurality of adhesive layers exist in the laminate for the flexible image display device, the thickness and the type of each adhesive layer may be the same or different.

As the aqueous solvent volatilization type adhesive, polymers dispersed in water such as a polyvinyl alcohol-based polymer, water-soluble polymers such as starch, an ethylene-vinyl acetate-based emulsion, a styrene-butadiene-based emulsion can be used as a main polymer. In addition to the main polymer and water, a crosslinking agent, a silane-based compound, an ionic compound, a crosslinking catalyst, an antioxidant, a dye, a pigment, an inorganic filler, an organic solvent and the like may be blended. In the case of the bonding by the aqueous solvent volatilization type adhesive, the aqueous solvent volatilization type adhesive is injected between the adherend layers to stick the adherend layers and dried to be able to impart an adhesive property. In the case of using the aqueous solvent volatilization type adhesive, the thickness of the adhesive layer is preferably 0.01 to 10 μm and more preferably 0.1 to 1 μm. When the aqueous solvent volatilization type adhesive is used in a plurality of layers, the thickness and the type of each layer may be the same or different.

The active energy ray curing type adhesive can be formed by curing an active energy ray curing composition containing a reactive material which forms an adhesive layer by irradiating the active energy ray. The active energy ray curing composition can contain at least one polymer of a radically polymerizable compound and a cationically polymerizable compound similar to those contained in the hard coat composition. As the radically polymerizable compound, the same compound as the radically polymerizable compound in the hard coat composition can be used.

As the cationically polymerizable compound, the same compound as the cationically polymerizable compound in the hard coat composition can be used.

As the cationically polymerizable compound used for the active energy ray curing composition, an epoxy compound is particularly preferable. It is also preferred to include a monofunctional compound as a reactive diluent in order to lower the viscosity as the adhesive composition.

The active energy ray composition can contain a monofunctional compound to lower the viscosity. Examples of the monofunctional compound include an acrylate-based monomer having one (meth)acryloyl group in one molecule thereof or a compound having one epoxy group or oxetanyl group in one molecule thereof, for example, glycidyl (meth) acrylate and the like.

The active energy ray composition can further contain a polymerization initiator. Examples of the polymerization initiator include a radical polymerization initiator, a cationic polymerization initiator, a radical and cationic polymerization initiator, which can be appropriately selected and used. These polymerization initiators are decomposed by at least one of the active energy ray irradiation and the heating to generate radicals or cations, thereby progressing the radical polymerization and the cationic polymerization. In the description of the hard coat composition, an initiator capable of initiating at least any one of the radical polymerization or the cationic polymerization by the active energy ray irradiation can be used.

The active energy ray curing composition can further include an ion scavenger, an antioxidant, a chain transfer agent, an adhesion imparting agent, a thermoplastic resin, a filler, a flow viscosity modifier, a plasticizer, an antifoam solvent, an additive, and a solvent. In the case of bonding two adherend layers by the active energy ray curing type adhesive, the active energy ray curing composition is applied to any one or both of the adherend layers and then stuck, and any one of the adhesive layer or both of the adherend layers are irradiated with the active energy ray to be cured and bonded. In the case of using the active energy ray curing type adhesive, the thickness of the adhesive layer is preferably 0.01 to 20 μm and more preferably 0.1 to 10 μm. When the active energy ray curing type adhesive is used in a plurality of adhesive layers, the thickness and the type of each layer may be the same or different.

As the pressure-sensitive adhesive, any classified into an acrylic-based pressure-sensitive adhesive, a urethane-based pressure-sensitive adhesive, a rubber-based pressure-sensitive adhesive, a silicone-based pressure-sensitive adhesive and the like can be used according to the main polymer. In addition to the main polymer to the pressure-sensitive adhesive, a crosslinking agent, a silane-based compound, an ionic compound, a crosslinking catalyst, an antioxidant, a tackifier, a plasticizer, a dye, a pigment, an inorganic filler and the like may be blended. Each component constituting the pressure-sensitive adhesive is dissolved and dispersed in a solvent to obtain a pressure-sensitive adhesive composition, and the pressure-sensitive adhesive composition is applied on the substrate and then dried to form a pressure-sensitive adhesive layer. The adhesive layer may be formed directly, or may be separately formed on a substrate and transferred. It is also preferred to use a release film to cover an adhesive surface prior to the bonding. In the case of using the active energy ray curing type adhesive, the thickness of the adhesive layer is preferably 0.1 to 500 μm and more preferably 1 to 300 μm. When the pressure-sensitive adhesive is used in a plurality of layers, the thickness and the type of each layer may be the same or different.

[Light Shielding Pattern]

The light shielding pattern may be applied as at least a part of a bezel or a housing of the flexible image display device. A wiring disposed on a side edge part of the flexible image display device is hidden by the light shielding pattern and is hardly recognized visually, such that the visibility of the image is improved. The light shielding pattern may be in the form of a single layer or multiple layers. The color of the light shielding pattern is not particularly limited, and may be various colors such as black, white and metal color. The light shielding pattern can be formed of a pigment for realizing a color and a polymer such as an acrylic-based resin, an ester-based resin, an epoxy-based resin, polyurethane, and silicone. These may be used alone or in combination of two or more. The light shielding pattern can be formed by various methods such as printing, lithography, and inkjet. A thickness of the light shielding pattern is preferably 1 to 100 μm and more preferably 2 to 50 μm. In addition, it is also preferable to provide a shape such as inclination in a thickness direction of the light shielding pattern.

EXAMPLES

Hereinafter, the present invention will be described in more detail by way of the Examples. Unless otherwise stated, "%" and "parts" in Examples mean % by mass and parts by mass. First, the evaluation method will be described.

<Weight Average Molecular Weight>

The gel permeation chromatography (GPC) measurement was performed using a liquid chromatograph LC-10ATvp manufactured by Shimadzu Corporation.

(1) Pretreatment Method

The polyimide-based resins obtained in Preparation Examples 1 to 4 were dissolved in γ-butyrolactone (GBL) to form a 20% by mass solution, which was diluted 100 times with a DMF eluent, and the diluted solution was filtered through a 0.45 μm membrane filter to form a measurement solution.

(2) Measurement Condition
Column: TSKgel Super AWM-H×2+Super AW 2500×1 (6.0 mm ID×150 mm×3)
Eluent: DMF (with 10 mmol of lithium bromide added)
Flow rate: 0.6 mL/min
Detector: RI detector
Column temperature: 40° C.
Injection amount: 20 μL
Molecular weight standard: Standard polystyrene <Imidization Rate>

The imidization rate was determined by $^1$H-NMR measurement as follows.

(1) Pretreatment Method

The polyimide-based resins obtained in Preparation Examples 1 to 4 were dissolved in deuterated dimethyl sulfoxide (DMSO-$d_6$) to form a 2% by mass solution as a measurement sample.

(2) Measurement Condition
Measurement device: 400 MHz NMR device JNM-ECZ400S/L1 manufactured by JEOL
Standard substance: DMSO-$d_6$ (2.5 ppm)
Sample temperature: Room temperature
The number of times of integration: 256 times
Relaxation time: 5 seconds (3) Imidization Rate Analysis Method (Imidization Rate of Polyimide Resin)

In the $^1$H-NMR spectrum obtained from the measurement sample containing the polyimide resin, among the observed benzene protons, the integral value of benzene proton A derived from the structure which was not changed before and after imidization was defined as $Int_A$. Also, the integral value of the amide proton derived from the amic acid structure remaining in the observed polyimide resin was defined as $Int_B$. The imidization rate of the polyimide resin was determined based on the following Equation from these integral values.

$$\text{Imidization rate (\%)} = 100 \times (1 - Int_B/Int_A)$$

(Imidization Rate of Polyamideimide Resin)

In the $^1$H-NMR spectrum obtained from the measurement sample containing the polyamideimide resin, among the observed benzene protons, the integral value of benzene proton C which is not affected by a structure derived from the structure which was not changed before and after imidization and a structure derived from the amic acid structure remaining in the polyamideimide resin was defined as $Int_C$. In addition, among the observed benzene protons, an integral value of benzene proton D which is affected by a structure derived from the structure which was not changed before and after imidization and the structure derived from the amic acid structure remaining in the polyamideimide resin was defined as $Int_D$. A β value was obtained from the determined $Int_C$ and $Int_D$ according to the following Equation.

$$\beta = Int_D/Int_C$$

Next, the β value of the above Equation for the plurality of polyamideimide resin and the imidization rate of the polyimide resin of the above Equation were obtained, and the following Correlation Equation was determined from these results.

$$\text{Imidization rate (\%)} = k \times \beta + 100$$

In the above Correlation Equation, k is a constant.

Substituting β into the Correlation Equation, the imidization rate (%) of the polyamideimide resin was obtained.

<Scattered Light Ratio (Ts)>

For the optical films obtained in the Example and the Comparative Examples, a diffuse light transmittance (Td) (%) was determined by a spectrophotometer CM3700A manufactured by Konica Minolta, Inc., in accordance with JIS K 7136. Further, a total light transmittance (Tt) (%) was determined by a haze meter NDH5000 manufactured by NIPPON DENSHOKU INDUSTRIES Co., LTD., in accordance with JIS K 7136. The resulting Td and Tt were substituted into the Formula of scattered light ratio (Ts)=Td/Tt×100 to calculate the scattered light ratio (Ts) (%) of the optical film.

<Tensile Modulus>

The tensile modulus of the optical films obtained in the Examples and the Comparative Examples was measured by performing a tensile test at a temperature of 80° C., a test speed of 5 m/min, and a load cell of 5 kN, using an electromechanical universal tester (manufactured by Instron Corporation), in accordance with JIS K 7127. The measurement was started after the optical film was allowed to stand in an environment of 80° C. for 5 minutes.

<Bending Test>

A bending test (bending radius R=1 mm, bending number 100 times) was performed by a small desk bending tester manufactured by YUASA SYSTEM Co., Ltd., in accordance with JIS K 5600-5-1. For the optical film after a bending test, the scattered light ratio after a bending test was measured, in the same manner as in the measurement method of the above-described <scattered light ratio (Ts)>, and the absolute value ΔTs of a difference in scattered light ratios before and after the bending test was calculated.

<Folding Endurance>

The number of times of bending of the optical film in the Examples and the Comparative Examples was determined as follows in accordance with ASTM standard D2176-16. The optical film was cut into strip forms of 15 mm×100 mm using a dumbbell cutter. The cut optical film was set in the main body of the MIT folding endurance fatigue tester ("Type 0530", manufactured by Toyo Seiki Seisaku-sho, Ltd.), the number of reciprocating bending in the back and forth direction until the optical film breaks were measured, under the conditions of a test speed of 175 cpm, a bending angle of 135°, a load of 0.75 kgf, a radius R of a bending clamp=1 mm, and this was taken as the number of times of bending.

<Yellow Index (YI Value)>

The yellow index (YI value) of the optical films obtained in the Examples and the Comparative Examples was measured using an ultraviolet-visible near infrared spectrophotometer, "V-670" manufactured by JASCO Corporation. After performing background measurement in the absence of the sample, the optical film was set on a sample holder, a transmittance for light of 300 to 800 nm was measured to determine tristimulus values (X, Y, Z), and the YI value was calculated based on the following Formula:

$$YI = 100 \times (1.2769X - 1.0592Z)/Y$$

<Thickness>

In the optical films obtained in the Examples and the Comparative Examples, the thicknesses of the optical film at 10 points or more were measured, using a micrometer ("ID-C112XBS" manufactured by Mitutoyo Corporation), and an average value was calculated. The average value was taken as the thickness of the optical film.

<Visibility Evaluation>

The optical films obtained in the Examples and the Comparative Examples were cut into a 10 cm square. The MD direction of the polarizing plate with an adhesive layer and the same size (square of 10 cm) and the MD direction of the cut optical film were aligned, and the polarizing plate with the adhesive layer was stuck to the cut optical film to produce a sample for evaluation. Two samples for evaluation were produced for each of the optical films of one Example and Comparative Example.

One of two samples for evaluation was fixed on a base so that a fluorescent lamp is positioned vertically to a plane of the sample for evaluation, and a longitudinal direction of the fluorescent lamp is horizontal to the MD direction of the sample for evaluation.

An observer visually observed the fluorescent lamp image on the surface of the sample for evaluation at an angle of 30° with respect to the vertical direction of the plane of the sample for evaluation.

Similarly, the other sample for evaluation was fixed on the base and the fluorescent lamp image was observed, except that the longitudinal direction of the fluorescent lamp was changed from horizontal to vertical.

From the observation results, the visibility was evaluated based on the following evaluation criteria.
(Evaluation Criteria for Visibility) ⊙: Distortion of the fluorescent lamp image is hardly visualized. ○: Some distortion of the fluorescent lamp image can be visually recognized. Δ: Distortion of the fluorescent lamp image is visualized. x: Distortion of the fluorescent lamp image is clearly visualized.

The optical films obtained in the Examples and the Comparative Examples have a protective film on one surface, but the measurement and evaluation were implemented using the optical film in the state in which the protective film was peeled off.

Preparation Example 1: Production of Polyimide Resin (1)

A separable flask equipped with a silica gel tube, a stirring apparatus, and a thermometer and an oil bath were prepared. To the flask, 75.6 g of 4,4'-(hexafluoroisopropylidene)diphthalic anhydride (6FDA) and 54.5 g of 2,2'-bis(trifluoromethyl)-4,4'-diaminodiphenyl (TFMB) were added. While stirring at 400 rpm, 530 g of N,N-dimethylacetamide (DMAc) was added and stirring was continued until the content of the flask became a uniform solution. Subsequently, stirring was continued for another 20 hours while the temperature in the container was adjusted to be in a range of 20 to 30° C. using the oil bath to cause reaction to produce a polyamic acid After 30 minutes, the stirring speed was changed to 100 rpm. After stirring for 20 hours, the temperature of the reaction system was returned to room temperature, 650 g of DMAc was added to adjust the polymer concentration to 10% by mass. Further, 32.3 g of pyridine and 41.7 g of acetic anhydride were added, and imidization was performed by stirring at room temperature for 10 hours. The polyimide varnish was taken out from the reaction container. The resulting polyimide varnish was dropped into methanol to perform reprecipitation, and the resulting powder was heated and dried to remove the solvent, thereby obtaining a polyimide resin (1) as a solid content. GPC measurement was performed for the resulting polyimide resin (1), and the weight average molecular weight was 350,000. Further, the imidization rate of the polyimide resin (1) was 98.8%.

Preparation Example 2: Production of Polyimide Resin (2)

A polyimide resin (2) was produced in the same manner as in Preparation Example 1, except that the reaction time was changed to 16 hours. The resulting polyimide resin (2) had a weight average molecular weight of 280,000 and an imidization rate of 98.3%.

Preparation Example: Production of Polyamideimide Resin (3)

Under a nitrogen gas atmosphere, 45 g (140.52 mmol) of TFMB and 768.55 g of DMAc were added to a 1 L separable flask equipped with a stirring blade, and TFMB was dissolved in DMAc while stirring at room temperature. Next, 18.92 g (42.58 mmol) of 6FDA was added to the flask and stirred at room temperature for 3 hours. Thereafter, 4.19 g (14.19 mmol) of 4,4'-oxybis(benzoyl chloride) (OBBC) and 17.29 g (85.16 mmol) of terephthaloyl chloride (TPC) were added to the flask and stirred at room temperature for 1 hour. Next, 4.63 g (49.68 mmol) of 4-methylpyridine and 13.04 g (127.75 mmol) of acetic anhydride were added to the flask and stirred at room temperature for 30 minutes, and then the temperature was raised to 70° C. using an oil bath and stirring was performed for another 3 hours to obtain a reaction solution.

The resulting reaction solution was cooled to room temperature and added to a large amount of methanol in a thread form, and the deposited precipitate was taken out, immersed in methanol for 6 hours, and washed with methanol. Next, the precipitate was dried at 100° C. under reduced pressure to obtain the polyamideimide resin (1). The weight average molecular weight of the polyamideimide resin (1) was 400,000, and the imidization rate was 98.1%.

Preparation Example 4: Production of Polyamideimide Resin (4)

Under a nitrogen gas atmosphere, 45 g (140.52 mmol) of TFMB and 768.55 g of DMAc were added to a 1 L separable flask equipped with a stirring blade, and TFMB was dissolved in DMAc while stirring at room temperature. Next, 19.01 g (42.79 mmol) of 6FDA was added to the flask, and stirred at room temperature for 3 hours. Thereafter, 4.21 g (14.26 mmol) of OBBC and then 17.30 g (85.59 mmol) of TPC were added to the flask, and stirred at room temperature for 1 hour. Next, 4.63 g (49.68 mmol) of 4-methylpyridine and 13.04 g (127.75 mmol) of acetic anhydride were added to the flask and stirred at room temperature for 30 minutes, and then the temperature was raised to 70° C. using an oil bath and stirring was performed for another 3 hours to obtain a reaction solution.

The resulting reaction solution was cooled to room temperature and added to a large amount of methanol in a thread form, and the deposited precipitate was taken out, immersed in methanol for 6 hours, and washed with methanol. Next, the precipitate was dried at 100° C. under reduced pressure to obtain a polyamideimide resin (2). The weight average molecular weight of the resulting polyamideimide resin (2) was 365,000, and the imidization rate was 98.3%.

Preparation Example 5: Production of Varnish (1) to Varnish (3)

The polyimide-based resin was dissolved in the solvent with the composition shown in Table 1, Sumisorb 340 (UVA) [2-(2-hydroxy-5-tert-octylphenyl)benzotriazole] manufactured by Sumika Chemtex Co., Ltd. was added as the ultraviolet absorbent so as to be 5.7% by mass relative to the mass of the resin, and the mixture was stirred until it became uniform, thereby obtaining the varnish (1) to varnish (3).

In addition, in Table 1, the value in the "solvent" column represents the ratio (% by mass) of the mass of the specific solvent relative to the total mass of the entire solvent. The value in the "polyimide-based resin" column represents the ratio (% by mass) of the mass of the specific polyimide-based resin relative to the total mass of the entire polyimide-based resin. PI-1, PI-2, PAI-1, and PAI-2 in the "polyimide-based resin" column represent polyimide resin (1), polyimide resin (2), polyamideimide resin (1), and polyamideimide resin (2), respectively. The value in the "additive" column represents the ratio (% by mass) of the mass of the additive relative to the mass of the resin. The value in the "solid content concentration" column represents the ratio (% by mass) of all components except the solvent relative to the mass of the varnish.

TABLE 1

|  | Solvent | | Polyimide-based resin | | | | Additive | Solid |
| --- | --- | --- | --- | --- | --- | --- | --- | --- |
|  | DMAc [% by mass] | GBL [% by mass] | PI-1 [% by mass] | PI-2 [% by mass] | PAI-1 [% by mass] | PAI-2 [% by mass] | UVA [% by mass] | content ratio [% by mass] |
| Varnish (1) | 10 | 90 | 50 | 50 | — | — | 5.7 | 16.5 |
| Varnish (2) | 10 | 90 | 90 | 10 | — | — | 5.7 | 15.0 |
| Varnish (3) | 0 | 100 | — | — | 50 | 50 | 5.7 | 8.2 |
| Varnish (4) | 0 | 100 | — | — | 90 | 10 | 5.7 | 7.5 |

Example 1: Production of Optical Film (1)

A coating film was formed by cast forming the varnish (1) on a polyethylene telephthalate (PET) film (manufactured by TOYOBO CO., LTD., "A4100", thickness of 188 μm, thickness distribution of ±2 μm). A linear velocity was 0.4 m/min. The coating film was dried by being sequentially heated at 70° C. for 8 minutes, 100° C. for 10 minutes, 90° C. for 8 minutes, and 80° C. for 8 minutes, and the coating film was peeled off from the PET film. The solvent was removed from the resulting raw material film 1 (width 700 mm), using a tenter-type dryer (configuration of 1 to 6 chambers) using a clip as a gripping tool, and thereafter, a PET-based protective film was bonded to one surface of the dried film to obtain an optical film 1 having a thickness of 79 μm. Drying of the raw material film 1 was performed in more detail, as follows. A temperature in the dryer was set to 200° C., a clip holding width was adjusted to 25 mm, a film conveyance speed was adjusted to 1.0 m/min, a ratio of a film width (distance between clips) of an inlet of the dryer and a film width of an outlet of a drying furnace was adjusted to 1.0, and a wind speed in each chamber of the tenter-type dryer was adjusted to 13.5 m/sec in one chamber, 13 m/sec in two chambers, 11 m/sec in three to six chambers. After the film was released from the clip, the clip portion was slit, and the PET-based protective film was bonded to one surface of the film and wound on a 6-inch core manufactured by ABS to obtain the optical film 1.

Preparation Example 2: Production of Optical Film (2)

The optical film (2) having a thickness of 49 μm was produced in the same manner as in the production method of the optical film (1), except that the varnish (1) was changed to the varnish (2), the linear velocity was changed from 0.4 m/min to 0.3 m/min, and the heating conditions of the coating film was subsequently changed from at 70° C. for 8 minutes, at 100° C. for 10 minutes, at 90° C. for 8 minutes, and at 80° C. for 8 minutes to at 80° C. for 10 minutes, at 100° C. for 10 minutes, at 90° C. for 10 minutes, and at 80° C. for 10 minutes.

Example 3: Production of Optical Film (3)

The optical film (3) having a thickness of 79 μm was produced in the same manner as in the production method of the optical film (1), except that the varnish (1) was changed to the varnish (3), and the linear velocity was changed from 0.4 m/min to 0.2 m/min.

Example 4: Production of Optical Film (4)

The optical film (4) having a thickness of 79 μm was produced in the same manner as in the production method of the optical film (1), except that the varnish (1) was changed to the varnish (4), the linear velocity was changed from 0.4 m/min to 0.2 m/min, and the heating conditions of the coating film was subsequently changed from to 90° C. for 8 minutes, at 100° C. for 10 minutes, at 90° C. for 8 minutes, and at 80° C. for 8 minutes.

Comparative Example 1

A polyimide film ("UPILEX" manufactured by Ube Industries, Ltd., 50 μm in thickness) was prepared as the optical film 5.

The results of evaluation of the total light transmittance Tt (%), the diffuse light transmittance Td (%), the scattered light ratio Ts (%), the tensile modulus (MPa), the absolute value ΔTs (%) of a difference in scattered light ratios before and after a bending test, YI, the folding endurance (times), and the visibility of Examples 1 to 4 and Comparative Example 1 are shown in Table 2.

TABLE 2

| | Tt (%) | Td (%) | Ts (%) | ΔTs (%) | Tensile modulus (MPa) | YI | Folding endurance | Visibility Evaluation Vertical direction | Visibility Evaluation Horizontal direction |
|---|---|---|---|---|---|---|---|---|---|
| Example 1 | 91.1 | 0.18 | 0.20 | 0.01 | 4,000 | 1.8 | 360,000 | ⊙ | ○ |
| Example 2 | 91.2 | 0.28 | 0.31 | 0.05 | 4,000 | 1.7 | 350,000 | Δ | Δ |
| Example 3 | 91.0 | 0.25 | 0.27 | 0.02 | 5,000 | 1.8 | 730,000 | ○ | ○ |
| Example 4 | 91.0 | 0.31 | 0.34 | 0.06 | 5,000 | 1.8 | 720,000 | Δ | Δ |
| Comparative Example 1 | 26.5 | 0.85 | 3.21 | 0.18 | 9,600 | 120.6 | >800,000 | × | × |

As shown in Table 2, it was confirmed that the optical films of Examples 1 to 4 wherein the scattered light ratio (Ts) is in the range of 0 to 0.35% had good results in the visibility evaluation, as compared with the optical film of Comparative Example 1 wherein the scattered light ratio is more than 0.35%. Further, it was also confirmed that the optical films of Examples 1 to 4 had excellent tensile modulus and folding endurance, and a low yellow index. Therefore, the optical films of Examples 1 to 4 have excellent visibility in the wide angle direction, and also have excellent tensile modulus, and the like.

What is claimed is:

1. An optical film comprising at least one resin selected from the group consisting of a polyimide-based resin and a polyamide-based resin,
wherein the optical film satisfies Formula (1):

$$0 \leq Ts \leq 0.35 \quad (1)$$

wherein Ts represents a scattered light ratio (%) and is defined as Ts=Td/Tt×100, Td and Tt represent a diffuse light transmittance (%) and a total light transmittance (%), measured in accordance with JIS K 7136, respectively,
wherein the optical film has:
an absolute value of a difference in the scattered light ratios before and after a bending test in accordance with JIS K 5600-5-1, (ΔTs), that is 0.15% or less,
a yellow index (YI) that is less than 2.0, calculated based on a formula of YI=100×(1.2769X−1.0592Z)/Y, after measuring the transmittance for light of 300 nm to 800 nm using an ultraviolet-visible near infrared spectrophotometer in accordance with JIS K 7373:2006 to determine tristimulus values (X, Y, Z), and
a folding endurance in an MIT folding endurance fatigue test in accordance with ASTM standard D2176-16 that is 300,000 or more,
said resin comprising a repeating structural unit represented by Formula (10) and a repeating structural unit represented by Formula (13):

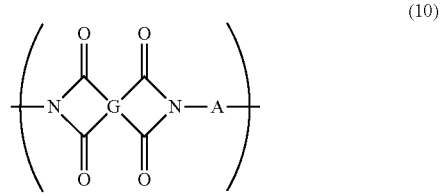

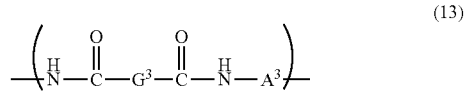

wherein G represents a tetravalent organic group and A represents a divalent organic group,
wherein $G^3$ represents a divalent organic group derived from terephthaloyl chloride and $A^3$ represents a divalent organic group, and
wherein the content of the repeating structural unit represented by Formula (13) is from 0.1 mol to 6.0 mole relative to 1 mol of the repeating structural unit represented by Formula (10).

2. The optical film according to claim 1, wherein the optical film has a tensile modulus at 80° C. that is 4,000 to 9,000 MPa.

3. The optical film according to claim 1, wherein the optical film has a thickness of 10 to 150 μm.

4. The optical film according to claim 1, wherein a content of a filler relative to a mass of the optical film is 5% by mass or less.

5. The optical film according to claim 1, wherein the optical film has a hard coat layer on at least one surface thereof.

6. The optical film according to claim 5, wherein the hard coat layer has a thickness of 3 to 30 μm.

7. A flexible display device comprising the optical film according to claim 1.

8. The flexible display device according to claim 7, further comprising a touch sensor.

9. The flexible display device according to claim 7, further comprising a polarizing plate.

* * * * *